(12) United States Patent
Machida et al.

(10) Patent No.: US 7,193,013 B2
(45) Date of Patent: Mar. 20, 2007

(54) POLYOLEFIN RESIN COMPOSITION

(75) Inventors: Shuji Machida, Chiba (JP); Kazuo Sato, Chiba (JP)

(73) Assignee: Idemitsu Kosan Co. Ltd., Tokyo (JP)

( * ) Notice: Subject to any disclaimer, the term of this patent is extended or adjusted under 35 U.S.C. 154(b) by 109 days.

(21) Appl. No.: 10/467,298

(22) PCT Filed: Feb. 6, 2002

(86) PCT No.: PCT/JP02/00952

§ 371 (c)(1),
(2), (4) Date: Aug. 7, 2003

(87) PCT Pub. No.: WO02/062889

PCT Pub. Date: Aug. 15, 2002

(65) Prior Publication Data
US 2004/0072950 A1   Apr. 15, 2004

(30) Foreign Application Priority Data
Feb. 7, 2001   (JP)   ............................... 2001-030644

(51) Int. Cl.
C08L 51/00 (2006.01)
C08L 51/06 (2006.01)
C08L 23/02 (2006.01)

(52) U.S. Cl. ........................... 525/70; 525/75; 525/86; 525/87

(58) Field of Classification Search ................ 525/70, 525/75, 86, 87, 191, 216, 240, 241
See application file for complete search history.

(56) References Cited

U.S. PATENT DOCUMENTS

| 5,250,629 | A | * | 10/1993 | Tani et al. ................ 528/268 |
| 5,455,300 | A | | 10/1995 | Smith et al. |
| 5,543,458 | A | * | 8/1996 | Hoxmeier et al. .......... 525/271 |
| 5,608,009 | A | * | 3/1997 | Machida et al. ............ 525/247 |
| 5,981,643 | A | * | 11/1999 | Datta et al. ................. 524/491 |
| 6,214,936 | B1 | * | 4/2001 | Mehler et al. ................ 525/89 |
| 6,515,059 | B1 | * | 2/2003 | Davis et al. ................. 524/426 |
| 2004/0072950 | A1 | * | 4/2004 | Machida et al. .............. 525/70 |

FOREIGN PATENT DOCUMENTS

| EP | 366411 | 5/1990 |
| EP | 0 490 269 A1 | 6/1992 |
| EP | 559108 | 9/1993 |
| EP | 0 667 359 A1 | 8/1995 |
| JP | 4-288355 | 10/1992 |
| JP | 10-316711 | 12/1998 |
| WO | WO 01/07493 A1 | 2/2001 |

* cited by examiner

Primary Examiner—Jeffrey Mullis
(74) Attorney, Agent, or Firm—Oblon, Spivak, McClelland, Maier & Neustadt, P.C.

(57) ABSTRACT

The present invention provides a polyolefin-based resin composition, comprising (A) a polyolefin I produced from at least one monomer selected from the group consisting of α-olefins, cyclic olefins and styrenes; (B) a polyolefin II produced from said at least one monomer, which differs in composition or properties from said polyolefin I; and (C) a graft copolymer produced by bonding said polyolefins I and II to each other through a polyene, wherein (a) a ratio $[(1/R_1)/(1/R_1)_0]$ of a relaxation velocity $(1/R_1)$ of a long-term relaxation component measured by a solid $^1$H-NMR method about the composition to a relaxation velocity $(1/R_1)_0$ of a long-term relaxation component measured by a solid $^1$H-NMR method about a resin mixture of only the components (A) and (B) is 1.01 or higher; and (b) an intrinsic viscosity [η] of the composition is in the range of 0.1 to 10 deciliter/g as measured in decalin at 135° C. The resin composition is readily controlled in property-determining factors such as morphology and interfacial strength, and is capable of providing a composite material composed of polyolefin-based resins according to properties as required.

14 Claims, No Drawings

POLYOLEFIN RESIN COMPOSITION

TECHNICAL FIELD

The present invention relates to a polyolefin-based resin composition and a molded article produced therefrom. More particularly, the present invention relates to a polyolefin-based resin composition that is readily controlled in property-determining factors such as morphology and interfacial strength and is capable of providing a composite material composed of polyolefin-based resins which has properties as required, by combining optional polyolefin-based resins, especially immiscible resins, and a molded article produced from the composition.

BACKGROUND ART

Conventionally, polyolefin-based resins have been extensively used in a variety of applications in the form of various molded articles, for example, sheets, films, injection-molded articles, blow-molded articles, foam-molded articles, vacuum-molded articles and rotational-molded articles which are formed into desired shapes or desired properties by various molding methods, because the polyolefin-based resins are chemically stable, and excellent in weather resistance, chemical resistance and mechanical strength.

Also, with a recent increasing tendency toward environmental protection, there is such a steady demand that general plastics are required to show a less burden to environments. Among them, polyolefin-based resins have been noticed as resins most suitable for reducing the burden to environments because of their excellent recyclability, good moldability and formation of less harmful components upon burning. Therefore, it is expected that the polyolefin-based resins are more frequently used in future, and are required to show highly improved properties.

However, even if one kind of polyolefin-based material is used solely, it is not possible to achieve the highly improved properties or various excellent properties as required. Therefore, to meet the above requirements, it has been conventionally attempted to combine a plurality of polyolefin-based materials to provide a suitable composite material.

However, in general, since different kinds of polyolefin-based resins are immiscible with each other, the morphology of the obtained composite material is regulated only to a limited extent, so that such a composite material fails to exhibit excellent combined properties of the respective polyolefin-based resins as expected.

On the other hand, Japanese Patent Application Laid-open No. Hei 2-281012 discloses a method of polymerizing a vinyl-based monomer or a vinylidene-based monomer using a radical polymerization initiator in the presence of a copolymer of propylene and dialkenyl benzene. Further, in Examples of the above Japanese Patent Application Laid-open No. Hei 2-281012, it is described that the thus obtained polymer is used as a miscibilizer for polypropylene and polystyrene.

In the method described in the above Japanese Patent Application Laid-open No. Hei 2-281012, a radical polymerizable monomer is polymerized using a radical polymerization initiator to produce graft chains having an atactic structure. Thus, the above method fails to produce polymers having an isotactic or syndiotactic structure capable of showing a more excellent heat resistance. Further, in the above Japanese Patent Application Laid-open No. Hei 2-281012, although it is merely described that the miscibilizer is applied to a composite material composed of isotactic polypropylene and isotactic polystyrene, there is no concrete description concerning application of the miscibilizer to other composite materials.

In addition, Japanese Patent Application Laid-open No. Hei 3-28209 discloses a graft copolymer produced by graft-polymerizing propylene to an ethylene-α-olefin-diene copolymer and a resin composition containing the graft copolymer, and further describes effects obtained by adding the graft copolymer to polypropylene and EPR. However, as shown in Examples of Japanese Patent Application Laid-open No. Hei 3-28209, since the graft copolymer contains gel components insoluble in a solvent, the obtained composite material is improved in properties only to a limited extent, and tends to show insufficient surface properties and poor appearance. Further, since the graft polymerization is usually conducted using a titanium trichloride type catalyst, the copolymerizability between diene residues and propylene is extremely low, thereby failing to achieve a high grafting rate. Therefore, since a large amount of graft sites, i.e., carbon-to-carbon unsaturated bonds remain unreacted, the obtained graft copolymer itself is inevitably deteriorated in heat stability, so that physical properties, heat stability, etc., of the composite material produced from such a graft copolymer are controlled only to a limited extent.

Also, the use of the above titanium trichloride type catalyst leads to not only production of polypropylene having a broad molecular weight distribution, but also production of a large amount of components soluble in ether or the like (low-stereoregular, low-molecular weight components) as well as by-products that do not contribute to improvement in miscibility, thereby causing such a problem that the obtained composite material tends to be deteriorated in physical properties.

DISCLOSURE OF THE INVENTION

Under the above circumstances, the object of the present invention is to provide a polyolefin-based resin composition that is readily controlled in property-determining factors such as morphology and interfacial strength and is capable of providing a composite material composed of polyolefin-based resins which has properties as required, by combining optional polyolefin-based resins, especially immiscible resins.

As a result of extensive researches for developing the polyolefin-based resin composition having these excellent properties, the inventors have found that the above object can be achieved by a resin composition that comprises a polyolefin I, a polyolefin II having different composition and properties from those of the polyolefin I, and a specific graft copolymer, and has specific properties. The present invention has been accomplished on the basis of this finding.

Namely, the present invention provides a polyolefin-based resin composition, comprising as essential components:

(A) a polyolefin I produced from at least one monomer selected from the group consisting of $C_2$ to $C_{20}$ α-olefins, cyclic olefins and aromatic vinyl compounds;

(B) a polyolefin II produced from at least one monomer selected from the group consisting of $C_2$ to $C_{20}$ α-olefins, cyclic olefins and aromatic vinyl compounds, which differs in at least one of kinds of constituting monomer units, stereoregularity, copolymerization composition, copolymerization type and kinds of different bonds, from the polyolefin I; and (C) a graft copolymer produced by bonding said polyolefins I and II to each other through a polyene, which has a xylene-insoluble content at 140° C. of 0 to 2.5% by weight, and a polyene-derived residual carbon-to-carbon double bond content of 0 to 0.15 mol %, wherein (a) a ratio $[(1/R_1)/(1/R_1)_0]$ of a relaxation velocity $(1/R_1)$ of a long-term relaxation component measured about the composition by a solid $^1$H-NMR method to a relaxation velocity $(1/R_1)_0$ of a long-term relaxation component measured by a solid $^1$H-NMR method about a resin mixture of only the components (A) and (B) is 1.01 or higher; and (b) an intrinsic viscosity [η] of the composition is in the range of 0.1 to 10 deciliter/g as measured in decalin at 135° C.

Also, the present invention provides a molded article produced from the above polyolefin-based resin composition.

BEST MODE FOR CARRYING OUT THE INVENTION

The polyolefin-based resin composition of the present invention contains as essential components, (A) a polyolefin I, (B) a polyolefin II and (C) a graft copolymer, and may also optionally contain (D) the other thermoplastic resin and/or an additive.

The polyolefin I as the component (A) is produced from at least one monomer selected from the group consisting of $C_2$ to $C_{20}$ α-olefins, cyclic olefins and aromatic vinyl compounds.

Examples of the $C_2$ to $C_{20}$ α-olefins include α-olefins such as ethylene, propylene, 1-butene, 3-methyl-1-butene, 4-methyl-1-butene, 4-phenyl-1-butene, 1-pentene, 3-methyl-1-pentene, 4-methyl-1-pentene, 3,3-dimethyl-1-pentene, 3,4-dimethyl-1-pentene, 4,4-dimethyl-1-pentene, 1-hexene, 4-methyl-1-hexene, 5-methyl-1-hexene, 6-phenyl-1-hexene, 1-octene, 1-decene, 1-dodecene, 1-tetradecene, 1-hexadecene, 1-octadecene, 1-eicocene and vinyl cyclohexane; and halogen-substituted α-olefins such as hexafluoropropene, tetrafluoroethylene, 2-fluoropropene, fluoroethylene, 1,1-difluoroethylene, 3-fluoropropene, trifluoroethylene and 3,4-dichloro-1-butene.

Examples of the cyclic olefins include compounds represented by the general formula (I):

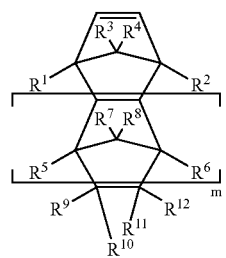

(I)

wherein $R^1$ to $R^{12}$ are independently a hydrogen atom, a $C_1$ to $C_{20}$ hydrocarbon group, or a substituent group containing halogen, oxygen or nitrogen; m is an integer of 0 or larger; $R^9$ or $R^{10}$ and $R^{11}$ or $R^{12}$ may be bonded to each other to form a ring, and $R^1$ to $R^{12}$ may be the same or different.

In the above general formula (I), examples of the $C_1$ to $C_{20}$ hydrocarbon group as $R^1$ to $R^{12}$ are $C_1$ to $C_{20}$ alkyl groups such as methyl, ethyl, n-propyl, isopropyl, n-butyl, isobutyl, t-butyl and hexyl; $C_6$ to $C_{20}$ aryl, alkylaryl or arylalkyl groups such as phenyl, tolyl and benzyl; $C_1$ to $C_{20}$ alkylidene groups such as methylidene, ethylidene and propylidene; or the like, with the proviso that $R^1$, $R^2$, $R^5$ and $R^6$ are not an alkylene group, and if any of $R^3$, $R^4$ and $R^7$ to $R^{12}$ is an alkylidene group, the carbon atom to which the alkylidene group is bonded does not have any substituent group other than the alkylidene group.

Examples of the substituent group containing halogen include halogen atoms such as fluorine, chlorine, bromine and iodine; $C_1$ to $C_{20}$ halogen-substituted alkyl groups such as chloromethyl, bromomethyl and chloroethyl; or the like.

Examples of the substituent group containing oxygen include $C_1$ to $C_{20}$ alkoxy or aryloxy groups such as methoxy, ethoxy, propoxy and phenoxy; $C_1$ to $C_{20}$ alkoxycarbonyl groups such as methoxycarbonyl and ethoxycarbonyl; or the like.

Examples of the substituent group containing nitrogen include $C_1$ to $C_{20}$ alkylamino groups such as dimethylamino and diethylamino; cyano; or the like.

Specific examples of the cyclic olefins represented by the above general formula (I) include norbornene, 5-methyl norbornene, 5-ethyl norbornene, 5-propyl norbornene, 5,6-dimethyl norbornene, 1-methyl norbornene, 7-methyl norbornene, 5,5,6-trimethyl norbornene, 5-phenyl norbornene, 5-benzyl norbornene, 5-ethylidene norbornene, 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-ethylidene-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 1,5-dimethyl-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2,3-dicyclo-1,4,5,8-dimethano-1,2,3,4,4a,5,8,8a-octahydronaphthalene, 2-isobutyl-1,4,5,8-dimethano-1,2,3,4,4a,5,8,8a-octahydronaphthalene, 1,2-dihydrodicyclopentadiene, 5-chloronorbornene, 5,5-dichloronorbornene, 5-fluoronorbornene, 5,5,6-trifluoro-6-trifluoromethyl norbornene, 5-chloromethyl norbornene, 5-methoxy norbornene, 5,6-dicarboxyl norbornene anhydrate, 5-dimethylaminonorbornene, 5-cyanonorbornene or the like.

Specific examples of the aromatic vinyl compounds include styrene; alkyl-styrenes such as p-methyl styrene, p-ethyl styrene, p-propyl styrene, p-isopropyl styrene, p-butyl styrene, p-tert-butyl styrene, p-phenyl styrene, o-methyl styrene, o-ethyl styrene, o-propyl styrene, o-isopropyl styrene, m-methyl styrene, m-ethyl styrene, m-isopropyl styrene, m-butyl styrene, mesityl styrene, 2,4-dimethyl styrene, 2,5-dimethyl styrene and 3,5-dimethyl styrene; alkoxy styrenes such as p-methoxy styrene, o-methoxy styrene and m-methoxy styrene; halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene and o-methyl-p-fluorostyrene; trimethylsilyl styrene; vinylbenzoic acid esters; or the like.

Examples of the polyolefin I as the component (A) include (1) ethylene homopolymers or ethylene-based copolymers containing ethylene units in an amount of more than 50 mol % which are obtained by copolymerizing ethylene with at least one compound selected from the group consisting of $C_3$ to $C_{20}$ α-olefins, cyclic olefins and aromatic vinyl compounds; (2) propylene homopolymers or propylene-based copolymers containing propylene units in an amount of more than 50 mol % which are obtained by copolymerizing propylene with at least one compound selected from the group consisting of $C_4$ to $C_{20}$ α-olefins, cyclic olefins and aromatic vinyl compounds, and in which the propylene chains have a stereoregularity of an atactic, syndiotactic (rrrr=35 to 100 mol %) or isotactic (mmmm=35 to 100 mol %) structure; (3) $C_4$ to $C_{20}$ α-olefin homopolymers, α-olefin-based copolymers obtained by copolymerizing at least two compounds selected from the group consisting of $C_4$ to $C_{20}$ α-olefins, or α-olefin-based copolymers containing $C_4$ to $C_{20}$ α-olefin units in an amount of more than 50 mol % which are obtained by copolymerizing at least one compound selected from the group consisting of $C_4$ to $C_{20}$ α-olefins with at least one compound selected from the group consisting of ethylene, propylene, cyclic olefins and aromatic vinyl compounds; (4) aromatic vinyl compound homopolymers, aromatic vinyl compound-based copolymers obtained by copolymerizing at least two compounds selected from the group consisting of aromatic vinyl compounds, or aromatic vinyl compound-based copolymers containing aromatic vinyl compound units in an amount of more than 50 mol % which are obtained by copolymerizing at least one compound selected from the group consisting of aromatic vinyl compounds with at least one compound selected from the group consisting of $C_2$ to $C_{20}$ α-olefins and cyclic olefins, and in which the aromatic vinyl compound chains have a stereoregularity of an atactic, syndiotactic (rrrr=35 to 100 mol %) or isotactic (mmmm=35 to 100 mol %) structure; (5) cyclic olefin homopolymers, cyclic olefin-based copolymers obtained by copolymerizing at least two compounds selected from the group consisting of cyclic olefins, or cyclic olefin-based copolymers containing cyclic olefin units in an amount of more than 50 mol % which are obtained by copolymerizing at least one compound selected from the group consisting of cyclic olefins with at least one compound selected from the group consisting of $C_2$ to $C_{20}$ α-olefins and aromatic vinyl compounds; or the like.

Specific examples of the above ethylene homopolymers and ethylene-based copolymers (1) include HDPE (high-density polyethylene), ethylene/propylene copolymer, ethylene/butene copolymer, ethylene/hexene copolymer, ethylene/octene copolymer, ethylene/decene copolymer, ethylene/eicosene copolymer, ethylene/styrene copolymer, ethylene/p-methyl styrene copolymer, ethylene/propylene/styrene tercopolymer, ethylene/p-phenyl styrene copolymer, ethylene/norbornene copolymer or the like.

Specific examples of the above propylene homopolymers and propylene-based copolymers (2) include isotactic polypropylene, syndiotactic polypropylene, atactic propylene, low-stereoregular isotactic polypropylene, propylene/ethylene copolymer, propylene/butene copolymer, propylene/hexene copolymer, propylene/octene copolymer, propylene/decene copolymer, propylene/eicosene copolymer, propylene/norbornene copolymer, propylene/styrene copolymer, propylene/p-methyl styrene copolymer, propylene/ethylene/styrene tercopolymer, propylene/p-phenyl styrene copolymer or the like.

Specific examples of the above $C_4$ to $C_{20}$ α-olefin homopolymers and $C_4$ to $C_{20}$ α-olefin-based copolymers (3) include polybutene, butene/ethylene copolymer, butene/propylene copolymer, butene/decene copolymer, butene/eicosene copolymer, butene/styrene copolymer, butene/ethylene/styrene tercopolymer, butene/norbornene copolymer, poly-4-methyl-penten-1, copolymers obtained by replacing butene of the above butene-based copolymers with 4-methyl-penten-1, or the like.

Specific examples of the above aromatic vinyl compound homopolymers and aromatic vinyl compound-based copolymers (4) include isotactic polystyrene, syndiotactic polystyrene, atactic polystyrene, styrene/ethylene copolymer, styrene/propylene copolymer, styrene/ethylene/propylene tercopolymer, styrene/octene copolymer, styrene/decene copolymer, styrene/eicosene copolymer, styrene/norbornene copolymer, styrene/p-methyl styrene copolymer or the like.

Specific examples of the above cyclic olefin homopolymers and cyclic olefin-based copolymers (5) include polynorbornene, norbornene/ethylene copolymer, norbornene/propylene copolymer, norbornene/styrene copolymer or the like.

In the present invention, as the polyolefin I as the component (A), there may be preferably used those polyolefins having the following properties.

First, the intrinsic viscosity [η] of the polyolefin I as measured at 135° C. in decalin which is used as an index of a molecular weight thereof is preferably in the range of 0.1 to 10 deciliter/g. When the intrinsic viscosity [η] is less than 1 deciliter/g, the obtained composition tends to be deteriorated in mechanical properties. On the other hand, when the intrinsic viscosity [η] exceeds 10 deciliter/g, the obtained composition tends to be deteriorated in moldability. For these reasons, the intrinsic viscosity [η] of the polyolefin I is more preferably 0.15 to 8 deciliter/g, still more preferably 0.20 to 7 deciliter/g, further still more preferably 0.50 to 6 deciliter/g and most preferably 0.70 to 5 deciliter/g.

Also, although the molecular weight distribution of the polyolefin I is not particularly restricted, the ratio (Mw/Mn) of weight-average molecular weight (Mw) to number-average molecular weight (Mn) thereof as measured by gel permeation chromatography (GPC) is usually in the range of 1.5 to 60.

As previously described, the steric configuration (stereoregularity) of the polyolefin I may be an isotactic, syndiotactic or atactic structure. As to the range of the stereoregularity, the isotactic structure preferably has a pentad fraction [mmmm] of 35 to 100 mol %, and the syndiotactic structure preferably has a pentad fraction [rrrr] of 35 to 100 mol %.

Here, [mmmm] means a proportion of such a steric structure in which all of five side chain groups are present on the same side relative to the carbon-to-carbon bond main chain constituted by optional continuous five monomers, and [rrrr] means a proportion of such a steric structure in which five side chain groups are alternately present on the opposite sides relative to the carbon-to-carbon bond main chain constituted by optional continuous five monomers.

Further, as to the copolymerization type of the polyolefin I, it may be in the form of any of a random copolymer, a block copolymer, a graft copolymer and an alternating copolymer.

On the other hand, the polyolefin II as the component (B) is produced from at least one monomer selected from the group consisting of $C_2$ to $C_{20}$ α-olefins, cyclic olefins and aromatic vinyl compounds. The monomers used for production of the polyolefin II are the same as those described above for the polyolefin I.

Specific examples of the polyolefin II include the same compounds as specified above for the polyolefin I. As the polyolefin II as the component (B), there may be used such polyolefins that are different in at least one of kinds of constituting monomer units, stereoregularity, copolymerization composition, copolymerization type and kinds of different bonds, from those of the polyolefin I.

Here, the condition that the polyolefins I and II are different in kinds of constituting monomer units from each other, means that the polyolefins I and II is different in at least one kind of constituting monomer unit from each other, or that one of the polyolefins I and II contains such a monomer unit that is not contained in the other of the polyolefins I and II. For example, this condition indicates the relationships between polyethylene and polypropylene, between ethylene/butene copolymer and polyethylene, between ethylene/butene copolymer and ethylene/octene copolymer, between propylene/butene copolymer and propylene/butene/octene tercopolymer, or the like.

Also, the condition that the polyolefins I and II are different in stereoregularity from each other, means that the polyolefins I and II that are identical in constituting monomer units and are in the form of either homopolymers produced from the same monomer selected from the group consisting of $C_3$ to $C_{20}$ α-olefins, cyclic olefins and aromatic vinyl compounds, or copolymers produced from the same two or more monomers selected from the group consisting of $C_2$ to $C_{20}$ α-olefins, cyclic olefins and aromatic vinyl compounds, are different in stereoregularity (i.e., three steric configurations including isotactic, syndiotactic and atactic structures) from each other. For example, the combination of the polyolefins I and II that are different in stereoregularity may be any of three combinations including atactic/isotactic, atactic/syndiotactic and isotactic/syndiotactic. The condition that the polyolefins I and II are different in stereoregularity from each other also involves such a condition that even though the polyolefins I and II are identical in kind of stereoregularity to each other, for example, are composed of any of combinations of isotactic/isotactic and syndiotactic/syndiotactic, both are different in stereoregular range, i.e., different in pentad fraction (mmmm=35 to 100 mol % or rrrr=35 to 100 mol %) from each other, for example, in such a combination in which a ratio between the pentad fractions (mmmm or rrrr) of the polyolefins I and II is in the range of 1.3 to 2.85.

Specific examples of the combinations of the polyolefins I and II that are different in stereoregularity from each other include isotactic polypropylene and syndiotactic polypropylene; atactic polypropylene and isotactic polypropylene; atactic polypropylene and syndiotactic polypropylene; isotactic polystyrene and syndiotactic polystyrene; atactic polystyrene and isotactic polystyrene; atactic polystyrene and syndiotactic polystyrene; low-stereoregular isotactic polypropylene and high-stereoregular isotactic polypropylene; or the like.

The condition that the polyolefins I and II are different in copolymerization composition from each other, means that the polyolefins I and II are identical in constituting monomer units, but are not identical in composition of copolymers involved. In this case, assuming that the monomer units constituting the copolymer are represented by $a_1, a_2, a_3, a_4 \ldots a_n$, and the contents of the respective monomer units of the polyolefin I are $C^I(a_n)$ [n=1, 2, 3, 4 . . . n; unit: mol %] and the contents of the respective monomer units of the polyolefin II are $C^{II}(a_n)$ [n=1, 2, 3, 4 . . . n; unit: mol %], the preferred combinations of the polyolefins I and II are those in which the ratio of $C^I(a_n)/C^{II}(a_n)$ or $C^{II}(a_n)/C^I(a_n)$ is preferably 1.2 or higher, more preferably 1.5 or higher, still more preferably 2.0 or higher, further still more preferably 2.5 or higher and most preferably 3.0 or higher.

When the above ratio is less than 1.2, the polyolefins I and II are analogous in mechanical properties or thermal properties, so that the composite polyolefin-based material obtained by combining these polyolefins may fail to show improved properties as aimed by the present invention. The upper limit of the above ratio is not particularly restricted since the larger ratio indicates the larger difference between properties of the polyolefins I and II, so that the composition having the aimed properties can be obtained by combining these polyolefins.

The condition that the polyolefins I and II are different in copolymerization type from each other, means that the polyolefins I and II are composed of combinations of any different two copolymers selected from random copolymer, block copolymer, alternating copolymer and graft copolymer as generally defined. The block copolymer includes, in addition to ordinary block copolymers constituted from mutually bonded blocks each composed of monomer units with an optional length, polypropylene-based resins produced by multi-stage polymerization reaction, i.e., so-called block polypropylenes as well as stereoregular block copolymers showing such a stereoregularity which varies at every optional chain length in the molecular chain, etc.

The condition that the polyolefins I and II are different in kinds of different bonds from each other, means that the bonds contained in the polyolefins I and II are different in kind from each other. The different kinds of bonds include head-to-head bond and tail-to-tail bond as well as 1,3-bond in α-olefins such as propylene or styrene-based monomers.

In the present invention, as the polyolefin II as the component (B), there may be preferably used those polyolefins having the following properties.

First, the polyolefin II preferably has an intrinsic viscosity [η] of 0.1 to 10 deciliter/g as measured at 135° C. in decalin. When the intrinsic viscosity [η] of the polyolefin II is less than 0.1 deciliter/g, the obtained composition tends to be deteriorated in mechanical properties. When the intrinsic viscosity [η] exceeds 10 deciliter/g, the composition tends to be deteriorated in moldability. For these reasons, the intrinsic viscosity [η] of the polyolefin II is more preferably 0.15 to 8 deciliter/g, still more preferably 0.20 to 7 deciliter/g, further still more preferably 0.50 to 6 deciliter/g and most preferably 0.70 to 5 deciliter/g.

The molecular weight distribution of the polyolefin II is not particularly restricted, but is usually in such a range that the ratio (Mw/Mn) of the weight-average molecular weight (Mw) to the number-average molecular weight (Mn) thereof as measured by GPC method is 1.5 to 60.

The graft copolymer used as the component (C) in the composition of the present invention includes those polymers obtained by bonding the above polyolefins I and II to each other through a polyene. That is, the graft copolymer contains in the same molecule, two different polyolefin-based polymers as segments which are selected from those illustrated above for the polyolefin I but are different in at least one of constituting monomer units, stereoregularity, copolymerization composition, copolymerization type and kinds of different bonds, from each other, and which are bonded to each other through a polyene, Specific examples of combinations of the two segments constituting the graft copolymer include:

| Segment 1 | Segment 2 |
|---|---|
| Combinations that are different in stereoregularity: | |
| Isotactic polypropylene | Atactic polypropylene |
| Isotactic polypropylene | Syndiotactic polypropylene |
| Atactic polypropylene | Syndiotactic polypropylene |
| Isotactic polystyrene | Atactic polystyrene |
| Isotactic polystyrene | Syndiotactic polystyrene |
| Atactic polystyrene | Syndiotactic polystyrene; |

Combinations that are different in kinds of monomer units:

| Isotactic polypropylene | Ethylene/α-olefin copolymer (propylene, butene, etc.) |
|---|---|
| Isotactic polypropylene | Polyethylene |
| Syndiotactic polypropylene | Polyethylene |
| Syndiotactic polystyrene | Polyethylene |
| Isotactic polypropylene | Ethylene/norbornene copolymer |
| Isotactic polypropylene copolymer | Ethylene/propylene/styrene |
| Polyethylene | Ethylene/norbornene copolymer |
| Syndiotactic polystyrene | Polyethylene |
| Syndiotactic polystyrene | Ethylene/α-olefin copolymer (propylene, butene, etc.) |
| Syndiotactic polystyrene copolymer | Ethylene/propylene/styrene |
| Atactic polystyrene copolymer | Ethylene/propylene/styrene |
| Polyethylene | Polybutene |
| Polyethylene | Ethylene/propylene copolymer |
| Polyethylene copolymer | Ethylene/propylene/styrene |
| Polypropylene | Polybutene; |

Combinations that are different in stereoregularity and kinds of monomer units:

| Isotactic polypropylene | Syndiotactic polystyrene |
|---|---|
| Isotactic polypropylene | Isotactic polystyrene |
| Syndiotactic polypropylene | Isotactic polystyrene |
| Atactic polystyrene | Syndiotactic polypropylene; |

Combinations that are different in copolymerization composition:

| Ethylene/propylene copolymer | Ethylene/propylene copolymer |
|---|---|
| Propylene/butene copolymer | Propylene/butene copolymer |

Among these combinations, those having copolymerization compositions within the range as defined herein;
Combinations that are different in copolymerization type:

| Ethylene/propylene random copolymer | Ethylene/propylene block copolymer |
|---|---|
| Ethylene/styrene pseudo-random copolymer | Ethylene/propylene block copolymer |
| Long-chain branched ethylene/ copolymer propylene copolymer or the like. | Ethylene/propylene random |

The polyene used in the graft copolymer is not particularly restricted, and may include various compounds having at least two polymerizable carbon-to-carbon double bonds in one molecule. As the preferred polyene, there may be used, for example, the following compounds (a) to (e):

(a) α, ω-type polyenes:
Compounds represented by the general formula (II):

$$CH_2=CH-Q-CH=CH_2 \quad (II)$$

wherein Q is a single bond or $C_0$ to $C_{20}$ alkylene.
Examples of the α, ω-type polyenes include 1,3-butadiene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,13-tetradecadiene, 1,15-hexadecadiene, 4-methyl-1,9-decadiene, 4,4-dimethyl-1,9-decadiene, 5-allyl-1,9-decadiene, 1,19-eicodiene or the like.

(b) Styrene-type polyenes:
Compounds represented by the general formula (III):

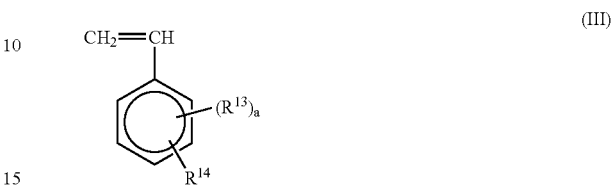

wherein $R^{13}$ is a hydrogen atom, a halogen atom or a substituent group containing carbon and/or silicon; $R^{14}$ is a substituent group containing an α-olefin residue; and a is an integer of 1 to 4 with the proviso that when a is 2 or larger, the plural $R^{13}$ groups may be the same or different.

Examples of the styrene-type polyenes include p-divinylbenzene, m-divinylbenzene, o-divinylbenzene, di(p-vinylphenyl)methane, 1,3-bis(p-vinylphenyl)propane, 1,5-bis(p-vinylphenyl)pentane or the like.

(c) Cyclic polyenes:
Compounds having an unsaturated bond and a norbornene skeleton represented by the general formula (IV):

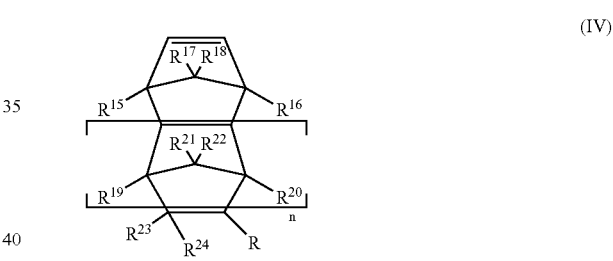

wherein $R^{15}$ to $R^{24}$ are independently a hydrogen atom, a halogen atom or a $C_1$ to $C_{20}$ hydrocarbon group with the proviso that $R^{15}$ to $R^{24}$ may be the same or different; R is $C_2$ to $C_{20}$ alkenyl; and n is an integer of 0 or larger, or Compounds having a cyclopentene skeleton and a norbornene skeleton represented by the general formula (V):

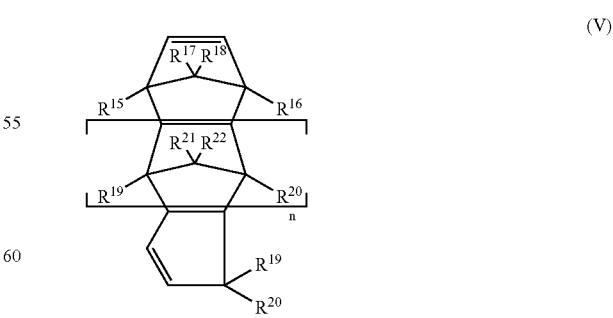

wherein $R^{15}$ to $R^{24}$ and n are the same as defined above.
Examples of the halogen atom as $R^{15}$ to $R^{24}$ include chlorine, fluorine, bromine, etc. Examples of the $C_1$ to $C_{20}$ hydrocarbon group as $R^{15}$ to $R^{24}$ include methyl, ethyl, propyl, butyl, pentyl, hexyl, cyclohexyl, octyl, decyl, dodecyl, tetradecyl, pentadecyl, heptadecyl, octadecyl, etc., as well as corresponding alkoxy groups thereof. The $R^{15}$ to $R^{24}$ groups may be the same or different.

Specific examples of the compounds represented by the above general formula (IV) include 5-vinyl-2-norbornene, 5-(3-butenyl)-2-norbornene, 5-allyl-2-norbornene, 5-(4-pentenyl)-2-norbornene, 5-(7-octenyl)-2-norbornene or the like. Specific examples of the compounds represented by the above general formula (V) include cyclopentadiene, dimethyl dicyclopentadiene, diethyl dicyclopentadiene or the like.

Also, as the cyclic polyenes (c), there may be used compounds represented by the general formula (VI):

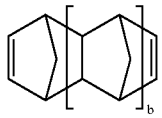

(VI)

wherein b is 0, 1 or 2.

Examples of the compounds represented by the general formula (VI) include bicyclo[2.2.1.]hepto-2,5-diene, tetracyclo[4.4.0.1$^{2,5}$.1$^{7,10}$]-3,8-dodecadiene, hexacyclo[6.6.1.1$^{3,6}$.1$^{10,13}$.0$^{2,7}$.0$^{9,14}$]-4,11-heptadecadiene or the like.

In addition, as the cyclic polyenes (c), there may also be used compounds represented by the general formula (VII):

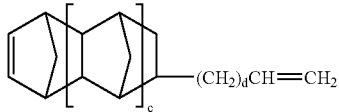

(VII)

wherein c is an integer of 1 or 2; and d is an integer of 0 to 11, and compounds represented by the general formula (VIII):

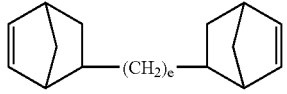

(VIII)

wherein e is an integer of 0 to 6.

Examples of the compounds represented by the general formula (VII) include 5-vinyl bicyclo[2.2.1]hepto-2-ene, 5-allyl bicyclo[2.2.1]hepto-2-ene, 5-(3-butenyl)bicyclo[2.2.1]hepto-2-ene, 8-vinyl tetracyclo[4.4.0.1$^{2,5}$.1$^{7,10}$]-3-dodecene, 11-vinyl hexacyclo[6.6.1.1$^{3,6}$.1$^{10,13}$.0$^{2,7}$.0$^{9,14}$]-4-heptadecene or the like. Examples of the compounds represented by the general formula (VIII) include 1,1-bis(5-bicyclo[2.2.1]hept-2-enyl)methane, 1,2-bis(5-bicyclo[2.2.1]hept-2-enyl) ethane, 1,6-bis(5-bicyclo[2.2.1]hept-2-enyl) hexane or the like.

(d) Styrene/α-olefin-type polyenes:

Compounds represented by the general formula (IX):

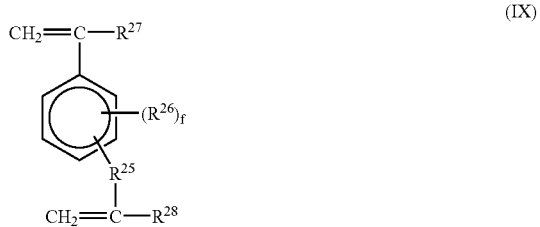

(IX)

wherein $R^{25}$ is a divalent $C_1$ to $C_{20}$ hydrocarbon group; $R^{26}$ is a halogen atom or a $C_1$ to $C_8$ hydrocarbon group; $R^{27}$ and $R^{28}$ are independently a hydrogen atom, a halogen atom or a $C_1$ to $C_8$ hydrocarbon group; and f is an integer of 0 to 4.

Examples of the divalent $C_1$ to $C_{20}$ hydrocarbon group as $R^{25}$ in the general formula (IX) include $C_1$ to $C_{20}$ alkylene, $C_6$ to $C_{20}$ arylene, $C_7$ to $C_{20}$ alkylarylene, $C_7$ to $C_{20}$ arylalkylene or the like. Specific examples of the divalent $C_1$ to $C_{20}$ hydrocarbon group as $R^{25}$ include methylene, ethylene, propylene, butylene, pentylene, hexylene, phenylene, tolylene or the like. Examples of the halogen atom as $R^{26}$ include chlorine, bromine, fluorine and iodine. Examples of the $C_1$ to $C_8$ hydrocarbon group as $R^{26}$ include saturated hydrocarbon groups, typically, for example, alkyl groups such as methyl, ethyl, propyl, butyl and pentyl, unsaturated hydrocarbon groups such as vinyl, or the like. Examples of the halogen atom and the $C_1$ to $C_8$ hydrocarbon group as $R^{27}$ and $R^{28}$ are the same as described above. Specific examples of the compounds represented by the general formula (IX) in which R25 is alkylene, include p-(2-propenyl)styrene, m-(2-propenyl)styrene, p-(3-butenyl)styrene, m-(3-butenyl)styrene, o-(3-butenyl)styrene, p-(4-pentenyl)styrene, m-(4-pentenyl)styrene, o-(4-pentenyl)styrene, p-(7-octenyl)styrene, p-(1-methyl-3-butenyl)styrene, p-(2-methyl-3-butenyl)styrene, m-(2-methyl-3-butenyl)styrene, o-(2-methyl-3-butenyl)styrene, p-(3-methyl-3-butenyl)styrene, p-(2-ethyl-3-butenyl)styrene, p-(2-ethyl-4-pentenyl)styrene, p-(3-butenyl)-α-methyl styrene, m-(3-butenyl)-α-methyl styrene, o-(3-butenyl)-α-(x-methyl styrene or the like.

Also, specific examples of the compounds represented by the general formula (IX) in which $R^{25}$ is arylene, include 4-vinyl-4'-(3-butenyl)biphenyl, 4-vinyl-3'-(3-butenyl)biphenyl, 4-vinyl-4'-(4-pentenyl)biphenyl, 4-vinyl-2'-(4-pentenyl)biphenyl, 4-vinyl-4'-(2-methyl-3-butenyl)biphenyl or the like.

(e) Other polyenes:

Further, as the polyene, there may be used monoalicyclic diene compounds. Specific examples of the monoalicyclic diene compounds include 1,4-cyclohexadiene, 1,5-cyclooctadiene, 1,5-cyclododecadiene, 4-vinyl cyclohexane, 1-allyl-4-isopropylidene cyclohexane, 3-allyl cyclopentene, 4-allyl cyclohexene, 1-isopropenyl-4-(4-butenyl)cyclohexane or the like.

Among these polyenes, preferred are those polyenes having a high-polymerizable carbon-to-carbon bonds and containing a less amount of residual unsaturated bonds that tend to cause deterioration in thermal stability upon production of the composition. Such preferred polyenes are the α-,ω-type polyenes (a), the styrene-type polyenes (b), the compounds (c) represented by the general formulae (VI), (VII) and (VIII), and the styrene/α-olefin-type polyenes (d).

In the present invention, the graft copolymer as the component (C) is required to have a 140° C. xylene insoluble content of 0 to 2.5% by weight. When the 140° C. xylene insoluble content exceeds 2.5% by weight, the graft copolymer is insufficiently dispersed and mixed in a melt or solution upon production of the resin composition, thereby failing to obtain the composition having the aimed properties, and further a molded article produced therefrom tends to show a poor appearance and suffer from deterioration in breaking strength due to concentrated stress. Therefore, the 140° C. xylene insoluble content of the graft copolymer (C) is preferably 0 to 1.5% by weight, more preferably 0 to 1.2% by weight, still more preferably 0 to 1.0% by weight, further still more preferably 0 to 0.5% by weight and most preferably 0 to 0.3% by weight.

The above xylene insoluble content is measured by the following method. That is, 2.0 g of the graft copolymer is placed in a 150 mesh stainless steel container, immersed in one liter of p-xylene at 140° C. and dissolved therein while stirring for 5 hours. After completion of the dissolution, the container is removed from the p-xylene bath, and the residual graft copolymer in the container is dried at 100° C. under reduced pressure until reaching a constant weight. The weight of the graft copolymer remaining in the container is divided by the weight of the graft copolymer initially charged to determine the p-xylene insoluble content (%) in the graft copolymer.

The graft copolymer as the component (C) may be generally produced by the following method, i.e., the method comprising the step [step 1] of producing an polyolefin containing a polyene residue, and the step [step 2] of subjecting the polyolefin obtained in the step 1 to graft copolymerization. In this case, in order to control and reduce the p-xylene insoluble content in the resultant graft copolymer, the following methods can be adopted.

Method (i): After completion of the step 1, the reaction solution is subjected to washing, etc., to remove unreacted polyene therefrom, followed by conducting the step 2.

In the method (i), it is preferred to use a slurry polymerization process for the step 1, and use a washing solvent incapable of dissolving the obtained polyolefin containing a polyene residue, since the polyolefin resin composition of the present invention can be produced with a high efficiency.

Method (ii): Two kinds of polyenes that are different in polymerizable sites from each other are employed in the steps 1 and 2, respectively.

Method (iii): Two kinds of metallocene catalysts that are different in polymerizable sites from each other are employed in the steps 1 and 2, respectively.

In particular, the combination of the methods (i), (ii) and (iii) is preferred.

In the present invention, the graft copolymer as the component (C) contains a polyene unit as an essential unit. The polyene unit content [D] in the graft copolymer is as small as usually 0.45 mol % or lower, preferably 0.40 mol % or lower, more preferably 0.35 mol % or lower, still more preferably 0.30 mol % or lower, further still more preferably 0.25 mol % or lower and most preferably 0.20 mol % or lower. When the polyene unit content [D] exceeds 0.45 mol %, there tends to arise the same problem as in the case where the xylene insoluble content exceeds 2.5% by weight.

The polyene unit content [D] may be measured by the following method.

Since one of features of the present invention resides in that the graft copolymer contains a small polyene unit content, it is required to select a measuring method suitable for detecting even a trace amount of the polyene unit.

(1) NMR method is used to quantitatively determine the polyene unit content when the content is close to its upper limit irrespective of the structure of the polyene component. The range measurable by this method is approximately from 0.05 to 0.45 mol % as the upper limit value.

(2) Infrared absorption spectrum method or ultraviolet absorption spectrum method is employable in the case where the polyene unit content is still smaller. However, in any of these methods, it is required that the polyene unit structure introduced into the graft copolymer has a specific absorption band in these spectra. In these methods, the detection limit is improved about 10 to 50 times that of the method (1).

(3) As the useful method for measuring a minute polyene unit content in the graft copolymer, there may also be used a method of evaluating a kinematic viscoelasticity of the graft copolymer from an angular velocity dependence thereof. The measuring method is based on such a fact that the shear rate-dependence of melt viscosity of a polyolefin containing a branched structure due to the polyene unit even in a minute amount is different from that of a polyolefin containing no branched structure.

Namely, the shear rate dependency of melt viscosity of the polyolefin having such a branched structure due to the polyene unit is larger than that of the polyolefin containing no branched structure. Therefore, the polyene unit forming the branched structure can be detected by comparing the shear rate dependency of melt viscosity of the graft copolymer with that of the polymer produced under the same conditions as those of the graft copolymer except for using no polyene.

Further, it is known that the above method is adversely affected by the molecular weight distribution of the polymer to be measured. However, in this case, by comparing the shear rate dependency of melt viscosity of the graft copolymer relative to its molecular weight distribution with that of the polyolefin apparently having no branched structure and containing the same kind of constituting monomer unit at the substantially same content, the polyene unit forming the branched structure can be surely detected.

The specific measuring method is exemplified below.

Apparatus: Melt viscosity-measuring device "RMS800" produced by Rheometrics Inc.

Measuring Conditions:

Temperature: Melting point or glass transition temperature or higher of the graft copolymer;

Usually, there is used a temperature higher by 10 to 60° C. than the maximum melting point of the graft copolymer, or a temperature higher by 10 to 200° C. than the maximum glass transition temperature of the graft copolymer.

Deflection: 15%;

Angular velocity: 0.01 to 100 rad/sec.;

Shape of specimen: Cone plate shape;

Data processing:

The value of $\omega_2/10\omega_1$ wherein $\omega_1$ represents an angular velocity at a storage elastic modulus of 10 Pa and $\omega_2$ represents an angular velocity at a storage elastic modulus of $10^3$ Pa is calculated.

<Detection of Polyene Unit>

Case 1:

In the case of using as a comparative specimen, a polyolefin which is produced under the same conditions as those of the graft copolymer except for using no polyene, and has a molecular weight distribution [weight-average molecular weight (Mw)/number-average molecular weight (Mn)] of 0.8 to 1.8 times that of the graft copolymer:

When the following formula (a) wherein $N^1$ represents the value of $\omega2/10\omega1$ of the graft copolymer and $N^0$ represents the value of $\omega02/10\omega1$ of the comparative specimen is satisfied, it is determined that the polyene unit is present in the graft copolymer.

Case 2:

In the case where the comparative specimen is made of a polyolefin apparently containing no branched structure and having the same kind and content of constituting monomer units as those of the graft copolymer, the polyene unit content in the graft copolymer is determined by the following method.

Here, the "same content of constituting monomer units" means that the comparative specimen is made of either one of the following materials:

(1) Polyolefin having the same sequences as those of the graft copolymer except for sequences derived from the polyene unit; and a polymeric structure other than a grafting structure whose monomer composition is substantially the same as that of the graft copolymer; and (2) Polyolefin mixture containing the polyolefin having the same sequences as those of the graft copolymer except for sequences derived from the polyene unit, and the other polyolefin having a polymeric structure other than a grafting structure, whose monomer composition is substantially the same as that of the graft copolymer.

A plurality of comparative specimens (used in the case 2) having different molecular weight distributions from each other are subjected to GPC to measure molecular weight distributions [weight-average molecular weight (Mw)/number-average molecular weight (Mn)] thereof, and further measure values $N^0$ ($\omega2/10\omega1$) thereof by the above-described method. Then, the thus obtained values of Mw/Mn and $N^0$ are plotted to determine a monotone increasing function $N^0=f(Mw/Mn)$ by a method of least square.

Next, the molecular weight distribution (Mw/Mn) and $N^1$ of the graft copolymer are measured, and the values $N^0$ and $N^1$ are compared with each other under the same molecular weight distribution. The existence of the polyene unit in the graft copolymer can be confirmed when the ratio of $N^1/N^0$ satisfies the following formula (a):

$$1.05 \leq N^1/N^0 \leq 80 \quad\quad (a)$$

| | |
|---|---|
| preferably | $1.10 \leq N^1/N^0 \leq 80$ |
| more preferably | $1.30 \leq N^1/N^0 \leq 70$ |
| still more preferably | $1.50 \leq N^1/N^0 \leq 65$ |
| further still more preferably | $1.70 \leq N^1/N^0 \leq 60$ |
| most preferably | $2.00 \leq N^1/N^0 \leq 55$ |

When the ratio $N^1/N^0$ is less than 1.05, the graft copolymer tends to be deteriorated in miscibility, thereby failing to obtain a composite material exhibiting sufficient physical properties. On the other hand, when the ratio $N^1/N^0$ exceeds 80, graft copolymers having a cross-linked structure are by-produced, resulting in formation of gels and, therefore, poor mixing property upon production of the composite material.

The graft copolymer as the component (C) is required to contain residual carbon-to-carbon double bonds derived from the polyene unit in an amount of 0 to 0.15 mol %. Meanwhile, the residual unsaturated bonds defined herein mean those derived from the polyene unit, but do not involve carbon-to-carbon double bonds bonded to terminals of polymers newly produced during the production process. When the amount of the residual carbon-to-carbon double bonds exceeds 0.15 mol %, the obtained composition tends to be deteriorated in weather resistance and thermal stability. The amount of the residual carbon-to-carbon double bonds contained in the graft copolymer is preferably 0 to 0.13 mol %, more preferably 0 to 0.11 mol %, still more preferably 0 to 0.09 mol %, further still more preferably 0 to 0.07 mol % and most preferably 0 to 0.05 mol %.

Also, the amount of the residual carbon-to-carbon double bonds is usually 0 to 30 mol %, preferably 0 to 28 mol %, more preferably 0 to 25 mol %, still more preferably 0 to 22 mol %, further still more preferably 0 to 18 mol % and most preferably 0 to 15 mol % based on the polyene unit.

The amount of the residual carbon-to-carbon double bonds derived from the polyene unit can be measured according to ordinary methods such as infrared absorption spectrum method and ultraviolet absorption spectrum method. Since the graft copolymer inherently contains a very small amount of the polyene unit, the amount of the unreacted carbon-to-carbon double bonds is further reduced. Therefore, if the amount of the residual carbon-to-carbon double bonds is below the detection limits of the above measuring methods and is therefore unmeasurable, the graft copolymer is regarded to contain substantially no unreacted carbon-to-carbon double bonds therein.

The graft copolymer as the component (C) may be generally produced by the following method, i.e., the method comprising the step [step 1] of producing a polyolefin containing a polyene residue, and the step [step 2] of subjecting the polyolefin obtained in the step 1 to graft copolymerization. In this case, in order to control and reduce the amount of the residual carbon-to-carbon double bonds contained in the resultant graft copolymer, the following methods can be adopted.

Method (i): The probability of reaction between the polyolefin containing a polyene residue and the monomer in the step 2 is increased. For this purpose, the polymerization time of the step 2 is prolonged, or the step 2 is conducted in the presence of a carrier-supported catalyst.

Method (ii): The step 2 is conducted in the presence of a catalyst showing a high copolymerization reactivity between the polyene residue and the monomer. As such a catalyst, there may be used catalysts employed in the below-mentioned Production Examples.

The graft copolymer as the component (C) is a graft copolymer containing segments having substantially the same chain structures as those of the polyolefin I as the component (A) and the polyolefin II as the component (B), respectively, which are bonded to each other through a polyene, in the same molecule. The graft copolymer (C) is not particularly limited in its structure as long as it exhibits a xylene insoluble content and an amount of unreacted carbon-to-carbon unsaturated bonds as defined in the present invention, and satisfies the condition that a relaxation velocity ratio of the resultant composition as measured by solid $^1$H-NMR method lies in the range as defined in the present invention. Preferably, the graft copolymer has the following intrinsic viscosity, stereoregularity and copolymerization composition.

(1) Intrinsic Viscosity:

The intrinsic viscosity [η] of the graft copolymer (C) as measured at 135° C. in decalin is preferably 0.1 to 10 deciliter/g, more preferably 0.2 to 9 deciliter/g, still more preferably 0.3 to 8 deciliter/g and most preferably 0.4 to 7 deciliter/g. When the intrinsic viscosity [η] is less than 0.1 deciliter/g, it may be difficult to well control properties of the obtained composition. When the intrinsic viscosity [η] exceeds 10 deciliter/g, the graft copolymer tends to be deteriorated in dispersibility upon production of the composition.

(2) Stereoregularity:

The ratio of (mmmm)g/(mmmm)po or the ratio of (rrrr)g/(rrrr)po is preferably 0.5 to 1.5, more preferably 0.6 to 1.4, still more preferably 0.65 to 1.35, further still more preferably 0.67 to 1.30 and most preferably 0.70 to 1.25. Meanwhile, the (mmmm)g or (rrrr)g represents the stereoregularity of the graft copolymer, and the (mmmm)po or (rrrr)po represents the stereoregularity of a portion of the polyolefin I or polyolefin II corresponding to the respective segments of the graft copolymer. When the ratio is less than 0.5 or exceeds 1.5, the graft copolymer tends to be deteriorated in miscibility with the polyolefin I or polyolefin II, thereby failing to improve properties of the obtained composition.

(3) Copolymerization Composition:

The compositions of respective monomer units present in the polyolefin I or II are represented by $a_{po}, b_{po}, c_{po} \ldots, n_{po}$.

On the other hand, the compositions of respective monomer units present in the segments of the graft copolymer corresponding to polyolefin I or II are represented by $a_g, b_g, c_g \ldots, n_g$.

Here, a, b, c . . . , n represent compositions of the respective monomer units, and a+b+c+ . . . +n=100%

The maximum value of the ratio of $n_{po}/n_g$ or $n_g/n_{po}$ (either one is selected so as to be 1 or higher; n represents a, b, c . . . , n) is preferably 20 or smaller, and the minimum value of the ratio is preferably 1.5 or smaller. When the ratio is out of the above-specified range, the obtained composite material tends to be insufficient in physical properties thereof. On the other hand, when the ratio is within the above range, there occurs no problem even though a small amount of the third monomer unit is contained in the graft copolymer. The content of the third monomer unit in the graft copolymer is usually 3 mol % or smaller.

The greater value of the ratio of $n_{po}/n_g$ or $n_g/n_{po}$ is more preferably 15 or smaller, still more preferably 10 or smaller, further still more preferably 8 or smaller and most preferably 5 or smaller, and the little value of the ratio of $n_{po}/n_g$ or $n_g/n_{po}$ is more preferably 1.4 or smaller, still more preferably 1.3 or smaller, further still more preferably 1.25 or smaller and most preferably 1.20 or smaller.

The graft copolymer as the component (C) may be produced, for example, by slurry polymerization, solution polymerization, gas phase polymerization, bulk polymerization, etc., using a metallocene-based catalyst as a main catalyst together with a co-catalyst composed of chain or cyclic aluminoxane, an ionic compound such as tetrakis(pentafluorophenyl)boric acid N,N-dimethyl anilinium, or a Lewis acid such as triphenyl boric acid. This production method generally comprises the step [step 1] of producing a polyolefin containing a polyene residue, and the step [step 2] of subjecting the polyolefin obtained in the step 1 to graft copolymerization.

The polyolefin-based resin composition of the present invention may contain, in addition to the polyolefin I as the component (A), the polyolefin II as the component (B) and the graft copolymer as the component (C), the other thermoplastic resin as the component (D) and/or an additive, if desired. The suitable combination of the components of the polyolefin-based resin composition according to the present invention include polyolefin I/polyolefin II/graft copolymer, polyolefin I/polyolefin II/graft copolymer/thermoplastic resin, polyolefin I/polyolefin II/graft copolymer/additive, and polyolefin I/polyolefin II/graft copolymer/thermoplastic resin/additive.

In the composition of the present invention, the polyolefin I as the component (A) and the polyolefin II as the component (B) are preferably used in a weight ratio of 1:99 to 99:1. The graft copolymer as the component (C) is preferably used in an amount of 0.01 to 30% by weight, more preferably 0.05 to 28% by weight, still more preferably 0.10 to 26% by weight, further still more preferably 0.20 to 24% by weight and most preferably 0.50 to 22% by weight based on the total weight of the components (A) and (B). When the amount of the component (C) used is less than 0.01% by weight or exceeds 30% by weight, the obtained composition tends to fail to exhibit aimed properties.

Also, the other thermoplastic resin as the component (D) is added in an amount of usually 0.5 to 60% by weight based on the total weight of the components (A), (B) and (C), and the additive is added in an amount of usually 0.0001 to 60% by weight based on the total weight of the components (A), (B) and (C).

The polyolefin-based resin composition of the present invention has a relaxation velocity $(1/R_1)$ of its long-term relaxation component of preferably 0.2 to 10 (1/sec), more preferably 0.3 to 9 (1/sec) and still more preferably 0.35 to 5 (1/sec) as measured by solid $^1$H-NMR method. In addition, the composition of the present invention is required to satisfy the condition that a ratio $[(1/R_1)/(1/R_1)_0]$ of the relaxation velocity $(1/R_1)$ of the long-term relaxation component measured by solid $^1$H-NMR method about the composition to a relaxation velocity $(1/R_1)_0$ of a long-term relaxation component measured by solid $^1$H-NMR method about a resin mixture composed of only the components (A) and (B) is 1.01 or higher. When the ratio $[(1/R_1)/(1/R_1)_0]$ is less than 1.01, the resins tends to be deteriorated in miscibility with each other, thereby failing to obtain the composition having the aimed properties. The ratio $[(1/R_1)/(1/R_1)_0]$ is preferably 1.02 or higher and more preferably 1.03 or higher.

Meanwhile, the ratio $[1/R_1)/(1/R_1)_0]$ is measured by an inverted restoration method (180°–τ–90° pulse method) using the following solid $^1$H-NMR measuring device.

Apparatus: "CPX-902" produced by Bruker Inc.

Nucleus to be measured: Hydrogen nucleus (1H)

Measuring frequency: 90 MHz

Measuring temperature: The relaxation velocities of the long-term relaxation components of the polyolefins I and II can be optionally set in different temperature ranges. Usually, the relaxation velocities of the long-term relaxation components of the polyolefins I and II are measured in a temperature of from 0° C. to 150° C., preferably in such a temperature range in which the difference therebetween becomes largest.

90° pulse width: 2.4 to 2.5 microseconds

The relaxation velocity ratio $[(1/R_1)/(1/R_1)_0]$ can be adjusted to 1.01 or higher, for example, by adopting the following methods for controlling the graft copolymer contained in the polyolefin-based resin composition.

(i) Increasing the amount of the graft copolymer used;

(ii) Increasing the number of branched chains in the graft copolymer;

(iii) Increasing the length of the branched chain in the graft copolymer; or (iv) Increasing both the number of branched chains and the length of the branched chain.

The composition of thee present invention is required to have an intrinsic viscosity [η] of 0.1 to 10 deciliter/g as measured at 135° C. in decalin. When the intrinsic viscosity [η] of the composition is less than 0.1 deciliter/g, the composition tends to be insufficient in mechanical properties. When the intrinsic viscosity [η] of the composition exceeds 10 deciliter/g, the composition tends to be deteriorated in moldability. For these reasons, the intrinsic viscosity [η] of the composition is preferably 0.15 to 8 deciliter/g, more preferably 0.20 to 7 deciliter/g, still more preferably 0.50 to 6 deciliter/g and most preferably 0.70 to 5 deciliter/g.

Upon selecting the polyolefin I as the component (A) and the polyolefin II as the component (B) used in the polyolefin-based resin composition of the present invention, one of the polyolefins I and II is first selected to clearly determine physical properties and functions to be improved as well as properties to be further added thereto. Then, the other polyolefin having the physical properties and functions to be improved as well as the properties to be further added is selected.

Examples of the physical properties and functions to be improved as well as the properties to be further added include transparency, elastic modulus, heat resistance, yield strength, breaking strength, low-temperature impact strength, heat sealing temperature, strength, tear strength, breaking elongation, crystallizability, melting point, solvent resistance, surface hardness, surface glossiness, shrinkage rate upon molding, appearance such as flow marks, mold-shape transferring property, etc.

The polyolefins may be selected, for example, in view of their properties that can be controlled by stereoregularity or by varying the copolymerization composition or kinds of constituting monomers. Examples of the properties of the polyolefins which can be controlled by stereoregularity are heat resistance, elastic modulus, strength, crystallizability, melting point, solvent resistance, shrinkage rate upon molding, impact strength, etc. Examples of the properties of the polyolefins which can be controlled by varying the copolymerization composition are transparency, elastic modulus, heat resistance, tensile strength, breaking strength, low-temperature impact strength, heat sealing temperature, strength, tear strength, breaking elongation, etc. Examples of the properties of the polyolefins which can be controlled by varying the kinds of constituting monomers include all of the above-described properties since the properties of the polyolefins are most remarkably influenced by the kinds of constituting monomers, thereby realizing a broad range of properties by combining the suitable monomers.

Examples of the other thermoplastic resin as the component (D) which may be optionally blended in the polyolefin-based resin composition of the present invention, include (1) polyolefins exemplified above for the polyolefins I and II except for the polyolefins used as the constituting components of the composition; (2) copolymers of olefin and a vinyl monomer, more specifically, ethylene/vinyl acetate copolymer, ethylene/acrylic acid copolymer, ethylene/ethyl acrylate copolymer, ethylene/methyl methacrylate copolymer, ionomers (metal ion-substituted products of ethylene/carboxylic acid-containing monomer copolymers such as sodium ion-neutralized products of ethylene/acrylic acid copolymer), ethylene/vinyl alcohol copolymer or the like; (3) modified olefin copolymers, more specifically, maleic anhydride-modified polypropylene, maleic anhydride-modified polyethylene or the like; (4) condensed-type polymers, more specifically, polycarbonates, polyacetal, polyamides such as nylon 6 and nylon 6,6, polyesters such as polyethylene terephthalate and polybutylene terephthalate, polyphenylene ethers, polysulfones, polyether sulfones, polyphenylene sulfides, thermoplastic polyimides or the like; (5) polymers obtained by addition polymerization reaction, for example, polymers obtained from polar vinyl monomers or diene-based monomers, more specifically, homopolymers such as polymethyl methacrylate, polystyrene, polyacrylonitrile, polyvinyl chloride, polybutadiene, polyisoprene and polyvinyl alcohol, acrylonitrile/butadiene/styrene copolymer, hydrogenated polymers such as SEBS, acrylonitrile/styrene copolymer, high-impact polystyrenes such as rubber-modified polystyrenes or the like; and (6) other resins such as petroleum resins and thermoplastic elastomers. These thermoplastic resins may be used singly or in the combination of any two or more thereof.

Examples of the additive which may be optionally blended in the composition of the present invention include nucleating agents, antioxidants, hydrochloric acid absorbers, heat stabilizers, light stabilizers, ultraviolet radiation absorbents, lubricants, antistatic agents, flame retardants, pigments, dyes, dispersants, copper inhibitors, neutralizers, foaming agents, plasticizers, defoamers, cross-linking agents, flow modifiers such as peroxides, weld strength modifiers or the like.

As the antioxidants, there may be used phenol-based, sulfur-based and phosphorus-based antioxidants, etc. Examples of the phenol-based antioxidants include phenols such as 2,6-di-tert-butyl-p-cresol, stearyl (3,3-dimethyl-4-hydroxybenzyl)thioglycolate, stearyl-β-(4-hydroxy-3,5-di-tert-butylphenol)propionate, distearyl-3,5-di-tert-butyl-4-hydroxybenzyl phosphonate, 2,4,6-tris(3',5'-di-tert-butyl-4'-hydroxybenzylthio)-1,3,5-triazine, distearyl (4-hydroxy-3-methyl-5-tert-butylbenzyl)malonate, 2,2'-methylenebis(4-methyl-6-tert-butylphenol), 4,4'-methylenebis(2,6-di-tert-butylphenol), 2,2'-methylenebis[6-(1-methylcyclohexyl)p-cresol], bis[3,5-bis(4-hydroxy-3-tert-butylphenyl)butyric acid]glycol ester, 4,4'-butylidenebis(6-tert-butyl-m-cresol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]t erephthalate, 1,3,5-tris(2,6-dimethyl-3-hydroxy-4-tert-butyl)benzyl isocyanurate, 1,3,6-tris(3,5-di-tert-butyl-4-hydroxybenzyl)-2,4,6-trimethyl benzene, tetrakis[methylene-3-(3,5-di-tert-butyl-4-hydroxyphenyl) propionate]methan e, 1,3,5-tris(3,5-di-tert-butyl-4-hydroxybenzyl)isocyanurate, 1,3,5-tris [(3,5-di-tert-butyl-4-hydroxyphenyl)propionyloxyethyl]isocyanurate, 2-octylthio-4,6-di-(4-hydroxy-3,5-di-tert-butyl)phenoxy-1,3,5-triazine and 4,4'-thiobis(6-tert-butyl-m-cresol); carbonic acid oligoesters of polyhydric phenols such as carbonic acid oligoesters of 4,4'-butylidenebis(2-tert-butyl-5-methylphenol) (e.g., polymerization degree: 2 to 10); or the like.

Examples of the sulfur-based antioxidants include dialkylthiodipropionates such as dilaurylthiodipropionate, dimyristylthiodipropionate and distearylthiodipropionate; esters of an alkylthiopropionic acid such as butylthiopropionic acid, octylthiopropionic acid, laurylthiopropionic acid and stearylthiopropionic acid, and a polyhydric alcohol such as glycerol, trimethylol ethane, trimethylol propane, pentaerythritol and trishydroxyethyl isocyanurate, for example, pentaerythritol tetralaurylthiopropionate; or the like.

Examples of the phosphorus-based antioxidants include trioctyl phosphite, tirlauryl phosphite, tridecyl phosphite, octyl diphenyl phosphite, tris(2,4-di-tert-butylphenyl)phosphite, triphenyl phosphite, tris(butoxyethyl)phosphite, tris (nonylphenyl) phosphite, distearyl pentaerythritol diphosphite, tetra(tridecyl)-1,1,3-tris(2-methyl-5-tert-butyl-4-hydroxyphenyl)butane diphosphite, tetra-($C_{12}$ to $C_{15}$ mixed alkyl)-4,4'-isopropylidenediphenyl diphosphite, tetra(tridecyl)-4,4'-butylidenebis(3-methyl-6-tert-butylphenol)diphosphite, tris(3,5-di-tert-butyl-4-hydroxyphenyl)phosphite, tris (mono- and di-mixed nonylphenyl)phosphite, hydrogenated-4,4'-isopropylidenediphenol polyphosphite, bis(octylphenyl)-bis[4,4'-butylidenebis(3-methyl-6-tert-butylphenol)]-1,6-hex anediol diphosphite, phenyl-4,4'-isopropylidenediphenol-pentaerythritol diphosphite, bis(2,4-di-tert-butylphenyl)pentaerythritol diphosphite, bis(2,6-di-tert-butyl-4-methylphenyl)pentaerythritol diphosphite, tris[4,4'-isopropylidenebis(2-tert-butylphenol)]phosphite, phenyl-diisodecyl phosphite, di(nonylphenyl) pentaerythritol diphosphite, tris(1,3-di-stearoyloxyisopropyl)phosphite, 4,4'-isopropylidenebis(2-tert-butylphenol)-di(nonylphenyl) phosphite, 9,10-dihydro-9-oxa-10-phosphaphenanthrene-10-oxide, tetrakis(2,4-di-tert-butylphenyl)-4,4'-biphenylene diphosphite, or the like.

In addition, as the other antioxidants, there may also be used 6-hydroxy chroman derivatives, for example, various tocopherols such as α-, β-, γ- and δ-tocopherols and mixtures thereof, 2,5-dimethyl-, 2,5,8-trimethyl- and 2,5,7,8-tetramethyl-substituted products of 2-(4-methyl-pent-3-enyl)-6-hydroxy chroman, 2,2,7-trimethyl-5-tert-butyl-6-hydroxy chroman, 2,2,5-trimethyl-7-tert-butyl-6-hydroxy chroman, 2,2,5-trimethyl-6-tert-butyl-6-hydroxy chroman, 2,2-dimethyl-5-tert-butyl-6-hydroxy chroman or the like.

The antioxidant may be usually used in an amount of 0.0001 to 10% by weight based on the total weight of the composition.

Examples of the hydrochloric acid absorbers include composite compounds such as $Mg_6Al_2(OH)_{16}CO_3.4H_2O$, $Mg_8Al_2(OH)_{20}CO_3.5H_2O$, $Mg_5Al_2(OH)_{14}CO_3.4H_2O$, $Mg_{10}Al_2(OH)_{22}(CO_3)_2.4H_2O$, $Mg_6Al_2(OH)_{16}HPO_4.4H_2O$, $Ca_6Al_2(OH)_{16}CO_3.4H_2O$, $Zn_6Al_2(OH)_{16}CO_3.4H_2O$, $Zn_6Al_2(OH)_{16}SO_4.4H_2O$, $Mg_6Al_2(OH)_{16}SO_4.4H_2O$ and $Mg_6Al_2(OH)_{12}CO_3.3H_2O$, calcium stearate, etc.

Examples of the ultraviolet radiation absorbents and the light stabilizers include hydroxybenzophenones such as 2-hydroxy-4-methoxy benzophenone, 2-hydroxy-4-n-octoxy benzophenone, 2,2'-dihydroxy-4-methoxy benzophenone and 2,4-dihydroxybenzophenone; benzotriazoles such as 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-5'-methylphenyl) benzotriazole and 2-(2'-hydroxy-3',5'-di-tert-amylphenyl) benzotriazole; benzoates such as phenyl salicylate, p-tert-butylphenyl salicylate, 2,4-di-tert-butylphenyl-3,5-di-tert-butyl-4-hydroxybenzoate and hexadecyl-3,5-di-tert-butyl-4-hydroxybenzoate; nickel compounds such as a nickel salt of 2,2'-thiobis(4-tert-octylphenol), a nickel salt of [2,2'-thiobis (4-tert-octylphenolato)]-n-butyl amine and a nickel salt of (3,5-di-tert-butyl-4-hydroxybenzyl)phosphonic acid monoethyl ester; substituted acrylonitriles such as α-cyano-β-methyl-β-(p-methoxyphenyl)acrylic acid methyl ester; oxalic acid dianilides such as N'-2-ethylphenyl-N-ethoxy-5-tert-butylphenyl oxalic acid diamide and N-2-ethylphenyl-N'-2-ethoxyphenyl oxalic acid diamide; hindered amine compounds such as condensed products of bis(2,2,6,6-tetramethyl-4-piperidine)sebacate, poly[((6-(1,1,3,3-tetramethylbutyl)imino)-1,3,5-triazin-2,4-diyl (4-(2,2,6,6-tetramethylpiperidyl)imino)hexamethylene] or 2-(4-hydroxy-2,2, 6,6-tetramethyl-1-piperidyl)ethanol with dimethyl succinate, or the like.

These ultraviolet radiation absorbents and light stabilizers may be usually added in an amount of 0.0001 to 10% by weight based on the total weight of the composition.

Examples of the lubricants include aliphatic hydrocarbons such as paraffin waxes, polyethylene waxes and polypropylene waxes; higher fatty acids such as capric acid, lauric acid, myristic acid, palmitic acid, margaric acid, stearic acid, arachidic acid and behenic acid or metal salts thereof such as lithium salts, calcium salts, sodium salts, magnesium salts and potassium salts; aliphatic alcohols such as palmityl alcohol, cetyl alcohol and stearyl alcohol; aliphatic amides such as caproamide, caprylamide, caprinamide, laurylamide, myristylamide, palmitylamide and stearamide; esters of fatty acids and alcohols; fluorine compounds such as fluoroalkyl carboxylic acids or metal salts thereof and fluoroalkyl sulfonic acid metal salts, or the like.

The nucleating agents used in the present invention may be appropriately optionally selected from conventional known nucleating agents. The suitable nucleating agents are aromatic phosphoric acid ester salts or dibenzylidene sorbitol. As the aromatic phosphoric acid ester salts, there may be used, for example, compounds represented by the general formula (X):

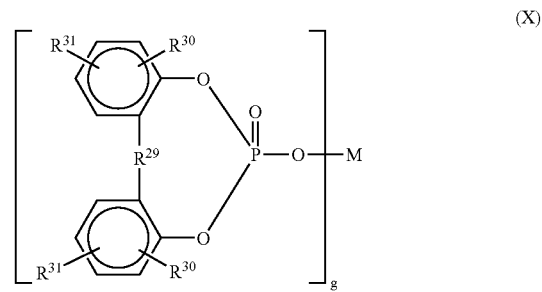

(X)

wherein $R^{29}$ is an oxygen atom, a sulfur atom or a $C_1$ to $C_{10}$ divalent hydrocarbon group; $R^{30}$ and $R^{31}$ are independently a hydrogen atom or a $C_1$ to $C_{10}$ hydrocarbon group in which $R^{30}$ and $R^{31}$ may be the same or different, and the two $R^{30}$ groups, the two $R^{31}$ groups or $R^{30}$ and $R^{31}$ may be respectively bonded to each other to from a ring; M is a mono- to tri-valent metal atom; and g is an integer of 1 to 3, and compounds represented by the general formula (XI):

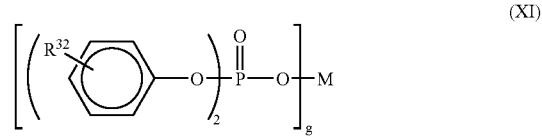

(XI)

wherein $R^{32}$ is a hydrogen atom or a $C_1$ to $C_{10}$ hydrocarbon group; and M and g are the same as defined above.

Examples of the compounds represented by the general formula (X) include sodium-2,2'-methylene-bis(4,6-di-tert-butylphenyl)phosphate, sodium-2,2'-ethylidene-bis(4,6-di-tert-butylphenyl)phosphate, lithium-2,2'-methylene-bis(4,6-di-tert-butylphenyl)phosphate, lithium-2,2'-ethylidene -bis (4,6-di-tert-butylphenyl)phosphate, sodium-2,2'-ethylidene-bis(4-isopropyl-6-tert-butylphenyl)phosphate, lithium-2,2'-methylene-bis(4-methyl-6-tert-butylphenyl)phosphate, lithium-2,2'-methylene-bis(4-ethyl-6-tert-butylphenyl) phosp hate, calcium-bis[2,2'-thiobis(4-methyl-6-tert-butylphenyl)phosphate], calcium-bis[2,2'-thiobis(4-ethyl-6-tert-butylphenyl)phosphate], calcium-bis[2,2'-thiobis(4,6-di-tert-butylphenyl)phosphate], magnesium-bis[2,2'-thiobis (4,6-di-tert-butylphenyl)phosphate], magnesium-bis[2,2'-thiobis-(4-tert-octylphenyl)phosphate], sodium-2,2'-butylidene-bis(4,6-di-methylphenyl)phosphate, sodium-2, 2'-butylidene-bis(4,6-di-butylphenyl)phosphate, sodium-2, 2'-tert-octylmethylene-bis(4,6-di-methylphenyl)phosphate, sodium-2,2'-tert-octylmethylene -bis(4,6-di-tert-butylphenyl)phosphate, calcium-bis-(2,2'-methylene-bis(4,6-di-tert-butylphenyl)phosphate), magnesium-bis[2,2'-methylene-bis (4,6-di-tert-butylphenyl)phosphate], barium-bis[2,2'-methylene-bis(4,6-di-tert-butylphenyl)phosphate], sodium-2,2'-methylene-bis(4-methyl-6-tert-butylphenyl)phosphate, sodium-2,2'-methylene-bis(4-ethyl-6-tert-butylphenyl) phosphate, sodium(4,4'-dimethyl-5,6'-di-tert-butyl-2,2'-biphenyl) phosphate, calcium-bis[(4,4'-dimethyl-6,6'-di-tert-butyl-2,2'-biphenyl)phosphate], sodium-2,2'-ethylidene-bis (4-n-butyl-6-tert-butylphenyl)phosphate, sodium-2,2'-methylene-bis(4,6-di-methylphenyl)phosphate, sodium-2,2'-methylene-bis(4,6-di-ethylphenyl)phosphate, potassium-2,2'-ethylidene-bis(4,6-di-tert-butylphenyl)phosphate, calcium-bis[(2,2'-ethylidene-bis(4,6-di-tert-butylphenyl) phosphate], magnesium-bis[(2,2'-ethylidene-bis(4,6-di-tert-butylphenyl)phosphate], barium-bis[(2,2'-ethylidene-bis(4,6-di-tert-butylphenyl)phosphate], aluminum-tris[2,2'-methylene-bis(4,6-di-tert-butylphenyl)phosphate], aluminum-tris[2,2'-ethylidene-bis(4,6-di-tert-butylphenyl) phosphate] and combinations thereof. Of these compounds, preferred is sodium-2,2'-methylene-bis(4,6-di-tert-butylphenyl)phosphate.

Examples of the compounds represented by the general formula (XI) include sodium-bis(4-tert-butylphenyl)phosphate, sodium-bis(4-methylphenyl)phosphate, sodium-bis (4-ethylphenyl)phosphate, sodium-bis(4-isopropylphenyl) phosphate, sodium-bis(4-tert-octylphenyl)phosphate, potassium-bis(4-tert-butylphenyl)phosphate, calcium-bis(4-tert-butylphenyl)phosphate, magnesium-bis(4-tert-butylphenyl)phosphate, lithium-bis(4-tert-butylphenyl)phosphate, aluminum-bis(4-tert-butylphenyl)phosphate and combinations thereof. Of these compounds, preferred is sodium-bis(4-tert-butylphenyl)phosphate.

On the other hand, as the dibenzylidene sorbitol, there may be used, for example, compounds represented by the general formula (XII):

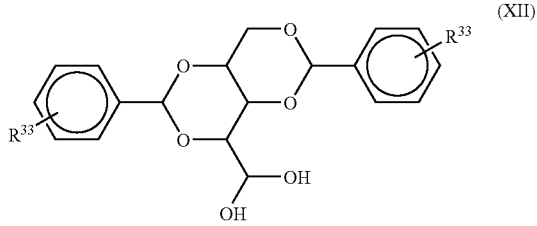

(XII)

wherein $R^{33}$ is a hydrogen atom or a $C_1$ to $C_{10}$ hydrocarbon group.

Examples of the compounds represented by the general formula (XII) include 1,3,2,4-dibenzylidene sorbitol, 1,3-benzylidene-2,4-p-methyl benzylidene sorbitol, 1,3-benzylidene-2,4-p-ethyl benzylidene sorbitol, 1,3-p-methylbenzylidene-2,4-benzylidene sorbitol, 1,3-p-ethylbenzylidene-2,4-benzylidene sorbitol, 1,3-p-methylbenzylidene-2,4-p-ethylbenzylidene sorbitol, 1,3-p-ethylbenzylidene-2,4-p-methylbenzylidene sorbitol, 1,3,2,4-di(p-methylbenzylidene) sorbitol, 1,3,2,4-di(p-ethylbenzylidene) sorbitol, 1,3,2,4-di(p-n-propylbenzylidene) sorbitol, 1,3,2,4-di(p-isopropylbenzylidene) sorbitol, 1,3,2,4-di(p-n-butylbenzylidene) sorbitol, 1,3,2,4-di(p-s-butylbenzylidene) sorbitol, 1,3,2,4-di(p-t-butylbenzylidene) sorbitol, 1,3,2,4-di(2',4'-dimethylbenzylidene) sorbitol, 1,3,2,4-di(p-methoxybenzylidene) sorbitol, 1,3,2,4-di(p-ethoxybenzylidene) sorbitol, 1,3-benzylidene-2,4-p-chlorobenzylidene sorbitol, 1,3-p-chlorobenzylidene-2,4-benzylidene sorbitol, 1,3-p-chlorobenzylidene-2,4-p-methylbenzylidene sorbitol, 1,3-p-chlorobenzylidene-2,4-p-ethylbenzylidene sorbitol, 1,3-p-methylbenzylidene-2,4-p-chlorobenzylidene sorbitol, 1,3-p-ethylbenzylidene-2,4-p-chlorobenzylidene sorbitol, 1,3,2,4-di(p-chlorobenzylidene) sorbitol and combinations thereof. Of these compounds, preferred are 1,3,2,4-dibenzylidene sorbitol, 1,3,2,4-di(p-methylbenzylidene) sorbitol, 1,3,2,4-di(p-ethylbenzylidene) sorbitol, 1,3-p-chlorobenzylidene-2,4-p-methylbenzylidene sorbitol, 1,3,2,4-di(p-chlorobenzylidene) sorbitol and combinations thereof.

In addition, as the nucleating agents, there may also be used metal salts of aromatic carboxylic acids, metal salts of aliphatic carboxylic acids or the like. Specific examples of the metal salts include aluminum benzoate, aluminum p-tert-butyl benzoate, sodium adipate, sodium thiophenecarboxylate, sodium pyrrolecarboxylate or the like. Further, as the nucleating agents, there may also be used polymers such as poly-4-methyl penten-1, and inorganic compounds such as talc.

The nucleating agent may be usually added in an amount of 0.0001 to 10% by weight based on the total weight of the composition.

The composition of the present invention may further contain inorganic fillers. Examples of the inorganic fillers usable in the present invention include powered fillers, e.g., natural silicic acid or silicates such as fine talc powder, kaolinite, calcined clay, pyrophyllite, sericite and wollastonite, carbonates such as precipitated calcium carbonate, heavy calcium carbonate and magnesium carbonate, hydroxides such as aluminum hydroxide and magnesium hydroxide, oxides such as zinc oxide, zinc white and magnesium oxide, and synthetic silicic acid or silicates such as hydrous calcium silicate, hydrous aluminum silicate, hydrous silicic acid and anhydrous silicic acid; flake-like fillers such as mica; fibrous fillers such as basic magnesium sulfate whiskers, calcium titanate whiskers, aluminum borate whiskers, sepiolite, PMF (processed mineral fibers), xonotlite, potassium titanate and ellestadite; balloon-shaped fillers such as glass balloons and fly ash balloons, or the like.

The polyolefin-based resin composition of the present invention can be produced by conventionally known methods without any particular limitation, such as the melt-kneading method using a kneader or extruder, and the method of dissolving or dispersing the constituting components in a solvent, and then removing the solvent from the resultant solution or pouring the solution into a poor solvent for the polymer to obtain the composition.

In the melt-kneading method, the polyolefin-based resin composition can be produced by first kneading the components using a kneading apparatus such as a single-screw extruder, a twin-screw extruder, a twin-screw kneader, a Babury mixer and rolls, and then forming the kneaded material into usually pellets.

The molded article of the present invention is formed by molding the thus obtained polyolefin-based resin composition by (1) method of forming the composition into a two-dimensional shape through a die, or (2) method of forming the composition into a three-dimensional shape using a metal mold or die. Examples of the molding method (1) include extrusion molding, profile molding, spinning, non-woven fabric molding, multi-layer molding, etc. Examples of the molding method (2) include injection molding, blow molding, vacuum molding, etc.

Specific examples of the molded article of the present invention include films, sheets, pipes, hollow molded products, fibers, injection-molded products, fabricated sheets, non-woven fabrics, multi-layer sheets or the like.

The present invention will be described in more detail by reference to the following examples. However, it should be noted that the following examples are only illustrative and not intended to limit the invention thereto.

PRODUCTION EXAMPLE 1

Production of HDPE-g-ENB (1) Preparation of Aluminum Oxy Compound

One thousand milliliters of a toluene solution of methyl aluminoxane (1.47 mol/liter; available from Albemarle Corporation; containing 14.5% by weight of trimethyl aluminum) was distilled at 60° C. under reduced pressure (2,660 Pa) to remove the solvent therefrom, and allowed to stand under this condition for 4 hours. The resultant product was cooled to room temperature to obtain a dried-up methyl aluminoxane.

Then, dehydrated toluene was added to the dried-up methyl aluminoxane to dissolve the latter again and obtain a toluene solution thereof having the same volume as that before the distillation. As a result of $^1$H-NMR of the resultant solution, it was confirmed that the amount of trimethyl aluminum contained in the methyl aluminoxane was 3.6% by weight. Also, as a result of the measurement by fluorescent X-ray (ICP) method, it was confirmed that the total amount of aluminum contained in the methyl aluminoxane was 1.32 mol/liter. Thereafter, the obtained solution was allowed to stand for 48 hours to precipitate insoluble components thereof The solution separated from the precipitate was filtered through a G5 glass filter to obtain toluene-soluble methyl aluminoxane. As a result of the measurement by IPC method, it was confirmed that the concentration of the toluene-soluble methyl aluminoxane was 1.06 mol/liter.

(2) Preparation of Carrier and Preparation of Carrier-Supported Methyl Aluminoxane Seventy grams of $SiO_2$ ("P-10" available from Fuji Silicia Co., Ltd.) was dried at 140° C. for 15 hours under a trace nitrogen flow. Then, 22.0 g of the thus dried $SiO_2$ was weighed and added to 200 milliliter of dehydrated toluene. After the resultant mixture was cooled to a constant temperature of 0° C. while stirring, 200 milliliter of the toluene solution of methyl aluminoxane prepared in the above step (1) was dropped thereinto for 60 minutes. After completion of the dropping, the resultant solution was heated to room temperature at which the solution was reacted for 30 minutes, and further heated to 70° C. at which the solution was reacted for 3 hours. After completion of the reaction, the obtained reaction mixture was held at 60° C., and the solid component thereof was washed with 200 milliliter of dehydrated toluene twice and then with 200 milliliter of dehydrated heptane twice. The obtained solids were dried at 50° C. under reduced pressure to obtain 32.8 g of $SiO_2$-supported methyl aluminoxane. The thus obtained $SiO_2$-supported methyl aluminoxane was charged again into dehydrated heptane and preserved in the form of a slurry.

(3) Preparation of Carrier-Supported Metallocene Catalyst

A 50 milliliter Schlenk tube was dried and purged with nitrogen, and then charged with 10 milliliter of dried heptane and 2 millimol (in terms of aluminum atom) of the $SiO_2$-supported methyl aluminoxane prepared in the above step (2), followed by stirring. One milliliter of a toluene solution containing isopropyl cylcopentadienyl fluorenyl zirconium dichloride [iPr(Cp)(Flu)ZrCl$_2$] in an amount of 5 micromol in terms of zirconium atom, was slowly added to the $SiO_2$-supported methyl aluminoxane, and reacted for 10 minutes.

(4) Production of Grafted Polyethylene

A 1.6 liter stainless steel pressure-tight autoclave was charged with 400 milliliter of dehydrated heptane and 1.0 millimol of triisobutyl aluminum, and the mixture was stirred at room temperature for 10 minutes. Then, a whole amount of the supported catalyst prepared in the above step (3) was added to the autoclave.

The resultant mixture was prepolymerized at 25° C. under an ethylene pressure of 0.2 MPa for 30 minutes to activate the catalyst, and then subjected to depressurization and blowing with nitrogen to remove unreacted ethylene therefrom. Then, 0.81 milliliter of a heptane solution containing 0.5 millimol of 1,9-decadiene was added to the obtained reaction solution, and then hydrogen was introduced thereinto until reaching 0.02 MPa. After setting the reaction temperature at 60° C. and introducing ethylene until reaching an ethylene partial pressure of 0.7 MPa, the polymerization reaction was initiated and continued for 210 minutes while controlling the reaction temperature to obtain polyethylene.

After completion of the reaction, the resultant reaction solution was cooled to room temperature and depressurized, and after termination of stirring, the liquid phase thereof was separated therefrom. Further, the solid reaction product was washed with a heptane solution of triisobutyl aluminum (1.25 mol/liter) three times by decantation to thereby adjust a volume of the heptane solution to 400 milliliter. Then, 73 milliliter of norbornene that was subjected to activated alumina treatment, dehydration and deoxygenation treatment, was added to the resultant solution, and the polymerization reaction was conducted at 80° C. under an ethylene pressure of 0.7 MPa for 90 minutes. After completion of the reaction, the reaction solution was depressurized to recover grafted polyethylene. As a result, it was confirmed that the amount of the thus recovered grafted polyethylene was 30.8 g.

Various properties of the thus obtained HDPE-g-ENB are shown in Table 1.

PRODUCTION EXAMPLE 2

Production of IPP-g-ENB (1) Preparation of Carrier-Supported Catalyst Component The same procedure as in the above step (3) of Production Example 1 was repeated except that 2 micromole of racemic dimethyl silylenebis(2-methyl-4-phenyl-indenyl)zirconium [rac-SiMe$_2$(2-Me-4-Ph-Ind)$_2$ZrCl$_2$] was used instead of the catalyst [iPr(Cp)(Flu)ZrCl$_2$], to prepare a carrier-supported catalyst component.

(2) Production of Grafted PP

A 1.6 liter stainless steel pressure-tight autoclave was charged with 400 milliliter of dehydrated heptane and 0.5 millimol of triisobutyl aluminum, and the mixture was stirred at room temperature for 10 minutes. Then, a whole amount of the supported catalyst prepared in the above step (1) was added to the autoclave.

The resultant mixture was prepolymerized at 25° C. under a propylene pressure of 0.3 MPa for 30 minutes to activate the catalyst, and then subjected to depressurization and blowing with nitrogen to remove unreacted propylene therefrom. Then, 0.81 milliliter of a heptane solution containing 0.5 millimol of 1,9-decadiene was added to the obtained reaction solution, and then hydrogen was introduced thereinto until reaching a hydrogen pressure of 0.02 MPa. After setting the reaction temperature at 60° C. and introducing propylene until reaching a propylene partial pressure of 0.6 MPa, the polymerization reaction was initiated and continued for 30 minutes while controlling the reaction temperature to obtain polypropylene.

After completion of the reaction, the resultant reaction solution was cooled to room temperature and depressurized, and after termination of stirring, the liquid phase thereof was separated therefrom. Further, the obtained solid reaction product was washed with a heptane solution of triisobutyl aluminum (1.25 mol/liter) three times by decantation to thereby adjust a volume of the heptane solution to 400 milliliter. Then, 4.5 milliliter of a toluene solution containing [iPr(Cp)(Flu)ZrCl$_2$] in an amount of 5 micromole was dropped in the heptane solution, and the obtained solution was stirred at room temperature for 36 minutes. Further, 73 milliliter of norbornene that was subjected to activated alumina treatment, dehydration and deoxygenation treatment, was added to the resultant solution, and the polymerization reaction was conducted at 90° C. under a ethylene pressure of 0.7 MPa for 180 minutes. After completion of the reaction, the reaction solution was depressurized to recover grafted polypropylene. As a result, it was confirmed that the yield of the thus recovered grafted polypropylene is 140 g.

Various properties of the thus obtained IPP-g-ENB are shown in Table 1.

PRODUCTION EXAMPLE 3

Production of HDPE-g-IPP

A 1.6 liter stainless steel pressure-tight autoclave was charged with 400 milliliter of dehydrated heptane and 0.5 millimol of triisobutyl aluminum, and the mixture was stirred at room temperature for 10 minutes. Then, the same supported catalyst as prepared in the above step (1) of Production Example 2 was added in an amount of 2 micromol in terms of zirconium atom to the autoclave.

The resultant mixture was prepolymerized at 25° C. under an ethylene pressure of 0.2 MPa for 30 minutes to activate the catalyst, and then subjected to depressurization and blowing with nitrogen to remove unreacted ethylene therefrom. Then, 0.81 milliliter of a heptane solution containing 0.5 millimol of 1,9-decadiene was added to the obtained reaction solution, and further hydrogen was introduced thereinto until reaching a hydrogen pressure of 0.05 MPa. After setting the reaction temperature at 60° C. and introducing ethylene until reaching a ethylene partial pressure of 0.6 MPa, the polymerization reaction was initiated and continued for 45 minutes while controlling the reaction temperature to obtain polyethylene.

After completion of the reaction, the resultant reaction solution was cooled to room temperature, and depressurized and blown with nitrogen to remove unreacted ethylene. Further, the polymerization reaction was conducted at 60° C. under a propylene pressure of 0.6 MPa for 180 minutes. After completion of the reaction, the reaction solution was depressurized to recover grafted polyethylene. As a result, it was confirmed that the yield of the thus recovered grafted polyethylene was 61.1 g.

Various properties of the thus obtained HDPE-g-IPP are shown in Table 1.

PRODUCTION EXAMPLE 4

Production of IPP-g-SPP

A 1.6 liter stainless steel pressure-tight autoclave was charged with 400 milliliter of dehydrated toluene and 0.5 milliliter of a toluene solution containing 0.2 millimol of 1,9-decadiene. Then, methyl aluminoxane (1.47 mol/liter; available from Albemarle Corporation; containing 14.5% by weight of trimethyl aluminum) was added to the autoclave such that the amount of methyl aluminoxane added was 4 millimol. The resultant mixture was stirred at room temperature for 10 minutes, and then 4 milliliter of a toluene solution containing [iPr(Cp)(Flu)ZrCl$_2$] and [rac-SiMe$_2$(2-Me-4-Ph-Ind)$_2$ZrCl$_2$] in amounts of 3 micromol and 1 micromol, respectively, was added thereto.

The resultant mixture was graft-polymerized at 70° C. under a propylene pressure of 0.3 MPa for 10 minutes. After completion of the reaction, the obtained reaction solution was cooled to room temperature and then depressurized to recover grafted polyethylene. As a result, it was confirmed that the yield of the thus recovered grafted polyethylene was 72.3 g.

Various properties of the thus obtained IPP-g-SPP are shown in Table 1.

PRODUCTION EXAMPLES 5 AND 6

Production of Propylene-based Graft Copolymer

The same procedure as in Production Example 4 was repeated except for changing the production conditions as shown in Table 2, to produce a propylene-based graft copolymer.

Various properties of the thus obtained APP-g-IPP (Production Example 5) and SPP-g-APP (Production Example 6) are shown in Table 1.

TABLE 1

| Production Examples and Comparative Production Examples | Grafted product | Intrinsic viscosity [η] (dl/g) | Polyene content [D] mol % | $N^1/N^0$ | Amount of unreacted polyene** (mol %) | p-xylene insoluble content (wt. %) |
|---|---|---|---|---|---|---|
| Production Example 1 | HDPE-g-ENB | 1.64 | A | 3.5 | B | 0 |
| Production Example 2 | IPP-g-ENB | 1.71 | A | 3.8 | B | 0 |
| Production Example 3 | HDPE-g-IPP | 1.41 | A | 2.5 | B | 0 |
| Production Example 4 | IPP-g-SPP | 1.28 | A | 1.8 | B | 0 |
| Production Example 5 | APP-g-IPP | 1.16 | A | 1.9 | B | 0 |

TABLE 1-continued

| Production Examples and Comparative Production Examples | Grafted product | Intrinsic viscosity [η] (dl/g) | Polyene content [D] mol % | Polyene content [D] $N^1/N^0$ | Amount of unreacted polyene** (mol %) | p-xylene insoluble content (wt. %) |
|---|---|---|---|---|---|---|
| Production Example 6 | SPP-g-APP | 2.12 | A | 3.2 | B | 0 |
| Production Example 7 | IPP-g-SPS | 2.01 | A | 3.9 | B | 0 |
| Production Example 8 | HDPE-g-SPS | 1.85 | A | 2.5 | B | 0 |
| Production Example 9 | IPP-g-Polyoctene | 1.15 | A | 3.5 | B | 0 |
| Production Example 10 | SPS-g-Polyoctene | 1.50 | A | 3.2 | B | 0 |
| Production Example 11 | IPP-g-LiPP | 2.31 | A | 4.3 | B | 0 |
| Comparative Production Example 1 | — | 1.50 | 0 | — | — | 0 |
| Comparative Production Example 2 | EPDM-g-IPP | * | 0.47 | * | 30 | about 3 |

Note:
A: Out of detection limit of $^1$H-NMR measurement; 0.1 mol % or lower
B: Out of detection limit of IR spectrum measurement
*Unmeasurable due to solvent-insoluble components
**Amount of residual carbon-to-carbon double bonds derived from polyene unit

PRODUCTION EXAMPLE 7

Production of IPP-g-SPS

A 1.6 liter stainless steel pressure-tight autoclave was charged with 300 milliliter of dehydrated toluene, 0.3 millimol of p-3-butenyl styrene, 100 milliliter of styrene and 1 millimol of triisobutyl aluminum. Then, methyl aluminoxane (1.47 mol/liter; available from Albemarle Corporation; containing 14.5% by weight of trimethyl aluminum) was added to the autoclave such that the amount of methyl aluminoxane added was 4 millimol. The resultant mixture was stirred at room temperature for 10 minutes. After heating the resultant mixture to 65° C., 2 milliliter of a toluene solution containing [rac-SiMe$_2$(2-Me-4-Ph-Ind)$_2$ZrCl$_2$] and 6,5,6-Ti(OMe)$_3$ in amounts of 1 micromol and 5 micromole, respectively, was added to the mixture, and the polymerization reaction was conducted at 70° C. under a propylene pressure of 0.5 MPa for 120 minutes. After completion of the reaction, the obtained reaction solution was cooled to room temperature and then depressurized to recover grafted polypropylene. As a result, it was confirmed that the yield of the thus recovered grafted polypropylene was 15.6 g.

Various properties of the thus obtained IPP-g-SPS are shown in Table 1. Meanwhile, "6,5,6-Ti(OMe)$_3$" represents octahydrofluorenyl titanium trimethoxide.

PRODUCTION EXAMPLE 8

Production of HDPE-g-SPS

The same procedure as in Production Example 7 was repeated except for using ethylene instead of propylene, to produce a grafted polyethylene.

Various properties of the thus obtained HDPE-g-SPS are shown in Table 1.

PRODUCTION EXAMPLE 9

Production of IPP-g-Polyoctene

A 1.6 liter stainless steel pressure-tight autoclave was charged with 400 milliliter of dehydrated heptane and 0.5 millimol of triisobutyl aluminum, and the resultant mixture was stirred at room temperature for 10 minutes. Then, the same catalyst as prepared in the above step (1) of Production Example 2 was entirely added in an amount of 2 micromole in terms of zirconium atom to the autoclave.

The resultant mixture was prepolymerized at 25° C. under a propylene pressure of 0.3 MPa for 30 minutes to activate the catalyst, and then subjected to depressurization and blowing with nitrogen to remove unreacted propylene therefrom. Then, 0.49 milliliter of a heptane solution containing 0.3 millimol of 1,9-decadiene was added to the obtained reaction solution, and further hydrogen was introduced thereinto until reaching a hydrogen pressure of 0.02 MPa. After setting the reaction temperature at 60° C. and introducing propylene until reaching a propylene partial pressure of 0.6 MPa, the polymerization reaction was initiated and continued for 30 minutes while controlling the reaction temperature to obtain polypropylene.

After completion of the reaction, the resultant reaction solution was cooled to room temperature and depressurized, and after termination of the stirring, the liquid phase was separated therefrom. Further, the solid reaction product was washed with a heptane solution of triisobutyl aluminum (1.25 mol/liter) three times by decantation to thereby adjust a volume of the heptane solution to 100 milliliter.

To the obtained solution was dropped 4.5 milliliter of a toluene solution containing a double cross-linked complex (Me$_2$Si)$_2$[3-CH$_2$SiMe$_3$-Ind]$_2$ZrCl$_2$ in an amount of 3 micromol, followed by stirring the solution at room temperature for 5 minutes. Further, 150 g of 1-octene was added to the resultant solution, and polymerized at 60° C. for 60 minutes. After completion of the reaction, the reaction solution was depressurized to recover grafted polypropylene. As a result, it was confirmed that the yield of the thus recovered grafted polypropylene was 76 g.

Various properties of the thus obtained IPP-g-polyoctene are shown in Table 1.

PRODUCTION EXAMPLE 10

Production of SPS-g-Polyoctene

A 1.6 liter stainless steel pressure-tight autoclave was charged with 300 milliliter of dehydrated toluene, 0.3 millimol of p-3-butenyl styrene, 150 g of 1-octene, 100 milliliter of styrene and 1 millimol of triisobutyl aluminum. Then, methyl aluminoxane (1.47 mol/liter; available from Albemarle Corporation; containing 14.5% by weight of trimethyl aluminum) was added to the autoclave such that the amount of methyl aluminoxane added was 4 millimol. The resultant mixture was stirred at room temperature for 10 minutes. After heating the resultant mixture to 60° C., 2 milliliter of a toluene solution containing a double cross-linked complex $(Me_2Si)_2[3-CH_2SiMe_3-Ind]_2ZrCl_2$ and 6,5,6-Ti(OMe)$_3$ in amounts of 3 micromol and 5 micromol, respectively, was added to the above reaction mixture, and the polymerization reaction was conducted at 60° C. for 120 minutes. After completion of the reaction, the obtained reaction solution was cooled to room temperature and then depressurized to recover grafted polystyrene. As a result, it was confirmed that the yield of the thus recovered grafted polystyrene was 42 g.

Various properties of the thus obtained SPS-g-polyoctene are shown in Table 1.

PRODUCTION EXAMPLE 11

Production of IPP-g-Low-Stereoregular Isotactic Polypropylene

A 1.6 liter stainless steel pressure-tight autoclave was charged with 400 milliliter of dehydrated heptane, 0.3 millimol of 1,9-decadiene and 0.5 millimol of triisobutyl aluminum, and the resultant mixture was stirred at room temperature for 10 minutes. Then, methyl aluminoxane (1.47 mol/liter; available from Albemarle Corporation; containing 14.5% by weight of trimethyl aluminum) was added to the autoclave such that the amount of methyl aluminoxane added was 2 millimol, and further 2 milliliter of a toluene solution containing as a metallocene catalyst, $(Me_2Si)_2[3-CH_2SiMe_3-Ind]_2ZrCl_2$ and [rac-SiMe$_2$(2-Me-4-Ph-Ind)$_2$ZrCl$_2$] in amounts of 0.5 micromol and 1 micromol, respectively, was added to the above reaction mixture. After setting the reaction temperature at 50° C. and introducing propylene until reaching a propylene partial pressure of 0.7 MPa, the polymerization reaction was initiated and continued for 30 minutes while controlling the reaction temperature to obtain polypropylene.

After elapse of the reaction time, while maintaining the reaction temperature, the reaction solution was depressurized and blown with nitrogen to completely remove gaseous components such as unreacted propylene therefrom. After completion of the polymerization reaction, the obtained reaction solution was depressurized to recover polypropylene. As a result, it was confirmed that the yield of the thus recovered polypropylene was 62 g.

Various properties of the thus obtained IPP-g-low-stereoregular isotactic polypropylene are shown in Table 1.

COMPARATIVE PRODUCTION EXAMPLE 1

Production of Mixture of HDPE and ENB

The same procedure as in Production Example 1 was repeated except for using no 1,9-decadiene in the step (4) of Production Example 1, thereby producing a mixture of polyethylene and ethylene/norbornene copolymer (ENB). As a result, it was confirmed that 28.5 g of the mixture was produced.

Various properties of the thus obtained mixture are shown in Table 1.

COMPARATIVE PRODUCTION EXAMPLE 2

Production of EPDM-g-IPP

EPDM-g-IPP was produced according to the method described in Example 1 of Japanese Patent Application Laid-open No. Hei3-28209. Various properties of the thus obtained EPDM-g-IPP are shown in Table 1.

Meanwhile, in Table 1, "Amount of unreacted polyene" represents a content of unreacted unsaturated groups in polyene present in the polymers to be copolymerized.

TABLE 2

| Production Examples | Catalytic component Compound | Amount used (µmol) | Propylene pressure (MPa) | Temp. (° C.) | Time (min) | Yield (g) |
|---|---|---|---|---|---|---|
| Production Example 5 | (Me$_2$Si)Cp*(t-BuN)TiCl$_2$ rac-Me$_2$Si[2-Me-4-Ph-Ind]$_2$ZrCl$_2$ | 4 0.5 | 0.3 | 70 | 30 | 96.7 |
| Production Example 6 | (Me$_2$Si)Cp*(t-BuN)TiCl$_2$ iPr(Cp)(Flu)ZrCl$_2$ | 4 3 | 0.7 | 50 | 30 | 55.7 |

*Cp represents a pentamethyl cyclopentadienyl group.

EXAMPLES 1 TO 10 AND COMPARATIVE EXAMPLES 1 TO 7

(1) Preparation of Composition

The resin components shown in Table 3 were mixed and dissolved in 300 milliliter of p-xylene using 500 ppm of BHT as an antioxidant (based on the total amount of the resin components) under the conditions shown in Table 3. It was confirmed that the amount of the polymers dissolved was 3 to 3.3 g. After 3 hours, it was recognized that the resin components were uniformly dissolved. Then, the polymer mixed solution was charged into 3 liters of methanol while stirring to re-precipitate and recover solids. After filtering, the obtained solids were dried at 80° C. under reduced pressure until reaching a constant weight, thereby obtaining the polyolefin composition.

(2) Solid $^1$H-NMR Measurement

The resin composition produced in the above step (1) was formed into a plate shape using a heat press, and pulverized into pellets as a specimen. The specimen was subjected to solid $^1$H-NMR by the above-mentioned method. The results are shown in Table 3.

The measurements of the respective compositions were performed at the following temperatures:

| Composition | Measuring temperature (° C.) | Examples and Comparative Examples |
|---|---|---|
| HDPE/ENB | 100 | Example 1; Example 2; Comparative Example 1; Comparative Example 2 |
| IPP/ENB | 130 | Example 3; Example 4; Comparative Example 3 |
| IPP/SPP | 120 | Example 5; Comparative Example 4 |
| IPP/APP | 30 | Example 6; Example 7; Comparative Example 5 |
| IPP/SPS | 90 | Example 8; Example 9; Comparative Example 6 |
| IPP/HDPE | 90 | Example 10; Comparative Example 7 |

Evaluation of Uniform Dissolvability

The uniform dissolvability was evaluated according to the above method of measuring the p-xylene insoluble content at 140° C. In the case where no insoluble components remained in the 150 mesh container, the dissolvability was regarded as "Good".

TABLE 3-1

| | Ex. 1 | Ex. 2 | Com. Ex. 1 | Com. Ex. 2 | Ex. 3 | Ex. 4 | Com. Ex. 3 |
|---|---|---|---|---|---|---|---|
| Composition of resins | | | | | | | |
| HDPE$^{(A)}$ (wt. %) | 83 | 83 | 83 | 83 | — | — | — |
| ENB$^{(B)}$ (wt. %) | 17 | 17 | 17 | 17 | 17 | 17 | 17 |
| IPP$^{(C)}$ (wt. %) | — | — | — | — | 83 | 83 | 83 |
| SPP$^{(D)}$ (wt. %) | — | — | — | — | — | — | — |
| APP$^{(E)}$ (wt. %) | — | — | — | — | — | — | — |
| SPS$^{(F)}$ (wt. %) | — | — | — | — | — | — | — |
| Graft copolymer (wt. part) | Pro. Ex. 1* (5) | Pro. Ex. 1 (10) | — | Comp. Pro. Ex. 1** (5) | Pro. Ex. 2 (5) | Pro. Ex. 2 (10) | — |
| Relaxation velocity (1/R$_1$) (1/sec) | 1.14 | 1.20 | — | — | 2.31 | 2.40 | — |
| Relaxation velocity (1/R$_1$)$_0$ (1/sec) | — | — | 1.08 | 1.08 | — | — | 2.15 |
| Relaxation velocity ratio [(1/R$_1$)/(1/R$_1$)$_0$] | 1.06 | 1.11 | — | 1.00 | 1.07 | 1.12 | — |
| Uniform dissolvability | Good | Good | Good | Good | Good | Good | Good |
| Intrinsic viscosity of resin composition [η] (dl/g) | 1.89 | 1.90 | 1.86 | 1.92 | 2.50 | 2.45 | 2.40 |

*Pr. Ex. = Production Example
**Comp. Pr. Ex. = Comparative Production Example

TABLE 3-2

| | Ex. 5 | Com. Ex. 4 | Ex. 6 | Ex. 7 | Com. Ex. 5 | Ex. 8 | Ex. 9 | Com. Ex. 6 |
|---|---|---|---|---|---|---|---|---|
| Composition of resins | | | | | | | | |
| HDPE$^{(A)}$ (wt. %) | — | — | — | — | — | — | — | — |
| ENB$^{(B)}$ (wt. %) | — | — | — | — | — | — | — | — |
| IPP$^{(C)}$ (wt. %) | 83 | 83 | 83 | 83 | 83 | 83 | 83 | 83 |
| SPP$^{(D)}$ (wt. %) | 17 | 17 | — | — | — | — | — | — |
| APP$^{(E)}$ (wt. %) | — | — | 17 | 17 | 17 | — | — | — |
| SPS$^{(F)}$ (wt. %) | — | — | — | — | — | 17 | 17 | 17 |
| Graft copolymer (wt. part) | Pro. Ex. 4 (10) | — | Pro. Ex. 5 (5) | Pro. Ex. 5 (10) | — | Pro. Ex. 7 (5) | Pro. Ex. 7 (10) | — |
| Relaxation velocity (1/R$_1$) (1/sec) | 2.30 | — | 1.38 | 1.37 | — | 0.426 | 0.435 | — |
| Relaxation velocity (1/R$_1$)$_0$ (1/sec) | — | 2.19 | — | — | 1.30 | — | — | 0.405 |
| Relaxation velocity ratio [(1/R$_1$)/(1/R$_1$)$_0$] | 1.05 | — | 1.06 | 1.05 | — | 1.05 | 1.07 | — |
| Uniform dissolvability | Good | Good | Good | Good | Good | Good | Good | Good |
| Intrinsic viscosity of resin composition [η] (dli/g) | 2.46 | 2.40 | 2.82 | 2.90 | 2.80 | 2.81 | 2.75 | 2.70 |

TABLE 3-3

| | Example 10 | Comparative Example 7 |
|---|---|---|
| Composition of resins | | |
| HDPE$^{(A)}$ (wt. %) | 20 | 20 |
| ENB$^{(B)}$ (wt. %) | 80 | 80 |
| IPP$^{(C)}$ (wt. %) | — | — |
| SPP$^{(D)}$ (wt. %) | — | — |
| APP$^{(E)}$ (wt. %) | — | — |
| SPS$^{(F)}$ (wt. %) | — | — |
| Graft copolymer (wt. part) | Production Example 3 (5) | — |
| Relaxation velocity (1/R$_1$) (1/sec) | 1.17 | — |
| Relaxation velocity (1/R$_1$)$_0$ (1/sec) | — | 1.08 |
| Relaxation velocity ratio [(1/R$_1$)/(1/R$_1$)$_0$] | 1.08 | — |
| Uniform dissolvability | Good | Good |
| Intrinsic viscosity of resin composition [η] (dl/g) | 2.29 | 2.20 |

Note:
$^{(A)}$HDPE: Available from Idemitsu Petrochemical Co., Ltd.; high-density polyethylene; grade name: 440 M; intrinsic viscosity [η]: 2.1 deciliter/g
$^{(B)}$ENB: Ethylene/norbornene copolymer; produced by copolymerizing ethylene and norbornene in a cyclohexane solvent using [iPr(Cp)(Flu)ZrCl$_2$]/MAO as a catalyst; intrinsic viscosity [η]: 0.91 deciliter/g; norbornene unit content: 27 mol %; random copolymer
$^{(C)}$IPP: Isotactic polypropylene; produced by homopolymerizing propylene in a heptane solvent using [rac-SiMe$_2$(2-Me-4-Ph-Ind)$_2$ZrCl$_2$]/MAO as a catalyst; intrinsic viscosity [η]: 2.76 deciliter/g; pentad fraction "mmmm": 97.3%
$^{(D)}$SPP: Syndiotactic polypropylene; produced by homopolymerizing propylene in a toluene solvent using [iPr(Cp)(Flu)ZrCl$_2$]/MAO as a catalyst; intrinsic viscosity [η]: 0.89 deciliter/g; pentad fraction "rrrr": 86.5%
$^{(E)}$APP: Isotactic polypropylene; produced by homopolymerizing propylene in a toluene solvent using [Cp*Me$_2$Si(t-BuN)TiCl$_2$]/MAO (so-called CGC-type catalyst) as a catalyst; intrinsic viscosity [η]: 3.10 deciliter/g
$^{(F)}$SPS: Syndiotactic polystyrene; produced by bulk-polymerizing propylene using [Cp*Ti(OMe)$_2$]/MAO as a catalyst; intrinsic viscosity [η] : 2.51 deciliter/g; pentad fraction "rrrr": 99.2%

In Comparative Examples 1, 5 and 6 in which the graft copolymer was not blended in the resin composition, no compatilizing component was present in the system when the polyolefins I and II were melt-kneaded to produce the resin composition. For this reason, interfacial adhesion between the polyolefins I and II was not enhanced, thereby failing to control the particle size of dispersed particles (particles of the polyolefin I or II) in the composition. Therefore, it was not possible to prepare a composite material composed of a polyolefin-based resin which had properties as required.

In Comparative Example 2, although the graft copolymer was blended in the polyolefin-based resin composition, the relaxation velocity ratio of the obtained composition was 1.00. Therefore, it was confirmed that the miscibility between the polyolefins I and II was not sufficiently enhanced. As a result, it was not possible to prepare a composite material composed of a polyolefin-based resin which had properties as required.

Meanwhile, although a resin composition containing the graft copolymer obtained in Comparative Production Example 2 was not illustrated herein, it is expected that since the graft copolymer obtained in Comparative Production Example 2 contains a large amount of residual carbon-to-carbon double bonds derived from the polyene unit and also has a large p-xylene insoluble content, the resin composition in which the graft copolymer of Comparative Production Example 2 is blended, tends to suffer from poor heat resistance and formation of blobs.

In contrast with the above Comparative Examples, in Examples of the present invention, the polyolefin-based resin compositions having specific properties were produced using the specific graft copolymers. For this reason, the miscibility between the polyolefins I and II as well as the interfacial adhesion therebetween can be sufficiently enhanced, and the particle size of dispersed particles can also be well controlled. As a result, the obtained resin compositions can be improved and well-controlled in properties such as mechanical strength, heat resistance, low-temperature impact strength and solvent resistance.

Further, the graft copolymers used in the respective Examples of the present invention have substantially no p-xylene insoluble components, and contains substantially no residual carbon-to-carbon double bonds. Therefore, the resin compositions of the respective Examples of the present invention which were produced using the graft copolymers, are free from blobs causing concentrated stress and can exhibit improved mechanical strength and excellent thermal stability.

INDUSTRIAL APPLICABILITY

According to the present invention, it is possible to obtain a polyolefin-based resin composition that can be readily controlled in property-determining factors such as morphology and interfacial strength by combination of optional polyolefin-based resins, in particular, combination of non-compatible resins, and can provide a composite material composed of polyolefin-based resins which has excellent properties as required.

What is claimed is:
1. A polyolefin-based resin composition, comprising
(A) a polyolefin I produced from at least one monomer selected from the group consisting of a $C_2$–$C_{20}$ α-olefin, a cyclic olefin, and an aromatic vinyl compound;
(B) a polyolefin II produced from at least one monomer selected from the group consisting of a $C_2$–$C_{20}$ α-olefin, a cyclic olefin, and an aromatic vinyl compound; which differs in at least one of kind of constituting monomer unit, stereoregularity, copolymerization composition, copolymerization type and kinds of different bonds, from said polyolefin I; and
(C) a graft copolymer produced by bonding said polyolefins I and II, present in said polyolefin-based resin composition, to each other through a polyene, which has a xylene-insoluble content at 140° C. of 0 to 2.5% by weight, and a polyene-derived residual carbon-to-carbon double bond content of 0 to 0.15 mol %,
wherein said component (A) and said component (B) are present at a weight ratio of 1:99 to 99:1, and further said component (C) is present in an amount of 0.01 to 30% by weight based on the total weight of said components (A) and (B),
and wherein an intrinsic viscosity [η] of the composition is in the range of 0.1 to 10 deciliter/g as measured in decalin at 135° C., and wherein the polyene is a compound selected from the group consisting of
α, ω-polyenes represented by the following formula II;

$$CH_2=CH\text{-}QCH=CH_2 \quad (II)$$

wherein Q is a single bond or $C_0$ to $C_{20}$ alkylene;
styrene-type polyenes represented by the following formula III:

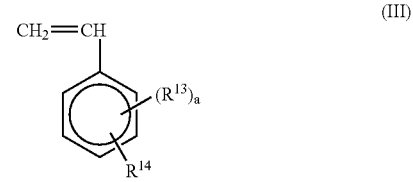

(III)

wherein $R^{13}$ is a hydrogen atom, a halogen atom or a substituent group containing carbon and/or silicon; $R^{14}$ is an unsaturated substituent group containing an α-olefin residue; and a is an integer of 1 to 4 with the proviso that when a is 2 or larger, the plural $R^{13}$ groups may be the same or different;

cyclic polyenes represented by the following formula IV:

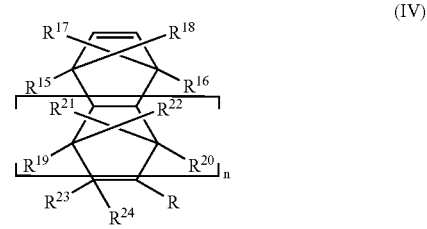

(IV)

wherein $R^{15}$ to $R^{24}$ are independently a hydrogen atom, a halogen atom or a $C_1$ to $C_{20}$ hydrocarbon group with the proviso that $R^{15}$ to $R^{24}$ may be the same or different; R is $C_2$ to $C_{20}$ alkenyl; and n is an integer of 0 or larger;

cyclic polyenes represented by the following formula V:

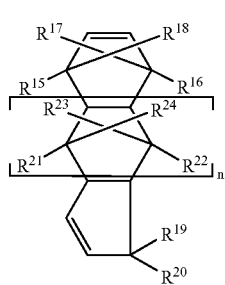

(V)

wherein $R^{15}$ to $R^{24}$ and n are the same as defined above;
cyclic polyenes represented by the following formula VI:

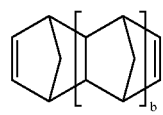

(VI)

wherein subscript b is 0, 1 or 2;
cyclic polyenes represented by the following formula VII:

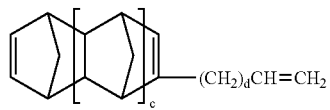

(VII)

wherein c is an integer of 1 or 2; and d is an integer of 0 to 11;
cyclic polyenes represented by the following formula VIII:

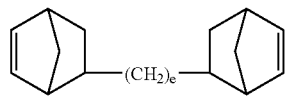

(VIII)

wherein e is an integer of 0 to 6;
styrene/α-olefin-type polyenes represented by the following formula IX:

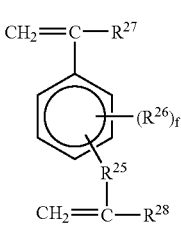

(IX)

wherein $R^{25}$ is a divalent $C_1$ to $C_{20}$ hydrocarbon group; $R^{26}$ is a halogen atom or a $C_1$ to $C_8$ hydrocarbon group; $R^{27}$ and $R^{28}$ are independently a hydrogen atom, a halogen atom or a $C_1$ to $C_8$ hydrocarbon group; and f is an integer of 0 to 4; and monoalicyclic dienes.

2. The polyolefin-based resin composition according to claim 1, wherein said polyolefin I as component (A) comprises ethylene units in an amount of more than 50 mol %.

3. The polyolefin-based resin composition according to claim 1, wherein said polyolefin I as component (A) comprises propylene units in an amount of more than 50 mol %.

4. The polyolefin-based resin composition according to claim 1, wherein said polyolefin I as component (A) comprises cyclic olefin units in an amount of more than 50 mol %.

5. The polyolefin-based resin composition according to claim 1, wherein said polyolefin I as component (A) comprises aromatic vinyl compound units in an amount of more than 50 mol %.

6. The polyolefin-based resin composition according to claim 1, further comprising (D) a thermoplastic resin.

7. The polyolefin-based resin composition according to claim 1, further comprising an additive.

8. A molded article produced from the polyolefin-based resin composition as claimed in claim 1.

9. A molded article produced from the polyolefin-based resin composition as claimed in claim 2.

10. A molded article produced from the polyolefin-based resin composition as claimed in claim 3.

11. A molded article produced from the polyolefin-based resin composition as claimed in claim 4.

12. A molded article produced from the polyolefin-based resin composition as claimed in claim 5.

13. A molded article produced from the polyolefin-based resin composition as claimed in claim 6.

14. A molded article produced from the polyolefin-based resin composition as claimed in claim 7.

* * * * *